United States Patent
Abreu et al.

(10) Patent No.: US 10,760,293 B2
(45) Date of Patent: Sep. 1, 2020

(54) LATTICE TOWER

(71) Applicant: SECCIONAL BRASIL S/A, Curitiba (BR)

(72) Inventors: Paulo Emmanuel de Abreu, Curitiba (BR); Odilon Antonio Camargo do Amarante, Curitiba (BR)

(73) Assignee: SECCIONAL BRASIL S/A, Curitiba (BR)

( * ) Notice: Subject to any disclaimer, the term of this patent is extended or adjusted under 35 U.S.C. 154(b) by 22 days.

(21) Appl. No.: 15/905,953

(22) Filed: Feb. 27, 2018

(65) Prior Publication Data

US 2018/0187445 A1 Jul. 5, 2018

Related U.S. Application Data

(63) Continuation of application No. 14/765,245, filed as application No. PCT/BR2013/000036 on Feb. 1, 2013, now Pat. No. 9,926,717.

(51) Int. Cl.
*E04H 12/00* (2006.01)
*E04H 12/10* (2006.01)
(Continued)

(52) U.S. Cl.
CPC ............... *E04H 12/10* (2013.01); *E04B 1/19* (2013.01); *E04C 3/08* (2013.01); *E04H 12/342* (2013.01);
(Continued)

(58) Field of Classification Search
CPC ................. E04B 1/19; E04B 2001/199; E04B 2001/1927; E04B 2001/1954;
(Continued)

(56) References Cited

U.S. PATENT DOCUMENTS

| 311,166 A | 1/1885 | Adams |
| 2,806,560 A * | 9/1957 | Cox ........................ E04H 12/10 52/637 |

(Continued)

FOREIGN PATENT DOCUMENTS

| BR | 9606177 A | 3/1998 |
| BR | 7800045 U | 12/1999 |

(Continued)

OTHER PUBLICATIONS

International Search Report and Written Opinion from corresponding PCT Application Serial No. PCT/BR2013/000036, dated Sep. 5, 2013.

(Continued)

*Primary Examiner* — Joshua J Michener
*Assistant Examiner* — James J Buckle, Jr.
(74) *Attorney, Agent, or Firm* — Meunier Carlin & Curfman LLC

(57) ABSTRACT

This invention relates to lattice tower for actuate under high load conditions, more particularly to lattice towers utilized for wind turbines and other applications comprising three metallic legs arranged in a triangular configuration around a vertical axis of the lattice tower, wherein each metallic leg has a closed cross-section profile, a distance between the center of metallic legs in a bottom portion of the tower is greater than 4 meters, an angle of inclination of a central longitudinal axis of each metallic leg in relation to the vertical axis of the tower is between −1.7 degree and +1.7 degrees, and the height of the lattice tower is greater than 60 meters, a plurality of bracing members and auxiliary bracing members and a support platform disposed at a top portion of the tower.

17 Claims, 33 Drawing Sheets

(51) Int. Cl.
*F03D 9/25* (2016.01)
*F03D 80/70* (2016.01)
*E04C 3/08* (2006.01)
*F03D 13/20* (2016.01)
*E04B 1/19* (2006.01)
*E04H 12/34* (2006.01)
*F03D 15/10* (2016.01)
*E04C 3/04* (2006.01)
*E04B 1/24* (2006.01)

(52) U.S. Cl.
CPC ............... *F03D 9/25* (2016.05); *F03D 13/20* (2016.05); *F03D 80/70* (2016.05); *E04B 2001/199* (2013.01); *E04B 2001/1927* (2013.01); *E04B 2001/1954* (2013.01); *E04B 2001/1993* (2013.01); *E04B 2001/2466* (2013.01); *E04B 2001/2478* (2013.01); *E04B 2103/06* (2013.01); *E04C 2003/0413* (2013.01); *E04C 2003/0469* (2013.01); *E04C 2003/0495* (2013.01); *F03D 15/10* (2016.05); *F05B 2240/9121* (2013.01); *Y02E 10/728* (2013.01)

(58) Field of Classification Search
CPC ..... E04B 2001/1993; E04B 2001/2466; E04B 2001/2478; E04B 2103/06; E04C 3/08; E04C 2003/0413; E04C 2003/0469; E04C 2003/0495; E04H 12/10; E04H 12/342; F03D 13/20
USPC .......................................................... 52/40
See application file for complete search history.

(56) References Cited

U.S. PATENT DOCUMENTS

| | | | | |
|---|---|---|---|---|
| 2,857,994 | A * | 10/1958 | Sheard | E04H 12/34 182/178.2 |
| 2,880,829 | A | 4/1959 | Watkins | |
| 3,119,471 | A * | 1/1964 | Turner | E04H 12/10 411/337 |
| 3,368,319 | A * | 2/1968 | Thomas | E04H 12/10 52/148 |
| 3,371,458 | A | 3/1968 | Sturgill | |
| 3,485,005 | A * | 12/1969 | Kutchai | E04H 12/10 52/638 |
| 3,634,989 | A | 1/1972 | Rogers | |
| 3,670,471 | A | 6/1972 | Smith | |
| 4,633,624 | A * | 1/1987 | Targetti | E04B 1/1903 403/310 |
| 4,848,966 | A | 7/1989 | Lefranc | |
| 4,909,011 | A | 3/1990 | Freeman et al. | |
| 5,396,674 | A | 3/1995 | Bolds | |
| 5,832,688 | A | 11/1998 | Crissey et al. | |
| 6,039,507 | A * | 3/2000 | Kennelly | E02B 17/0004 405/195.1 |
| 6,343,445 | B1 * | 2/2002 | Ryan | E04H 12/10 52/148 |
| 6,702,522 | B2 | 3/2004 | Silber | |
| 6,710,571 | B2 | 3/2004 | Menendez Fernandez | |
| 6,745,539 | B1 * | 6/2004 | Heim | E04H 12/10 52/651.01 |
| 7,347,030 | B2 * | 3/2008 | Lewison | E04C 3/02 52/648.1 |
| 7,877,934 | B2 | 2/2011 | Livingston et al. | |
| 8,203,230 | B2 | 6/2012 | Hennig | |
| 8,534,025 | B2 | 9/2013 | De Abreu | |
| 9,038,348 | B1 * | 5/2015 | Fang | E04B 1/19 52/651.01 |
| 2005/0218656 | A1 | 10/2005 | Wobben | |
| 2008/0127595 | A1 | 6/2008 | Reynolds et al. | |
| 2009/0249707 | A1 | 10/2009 | Curme | |
| 2010/0162652 | A1 * | 7/2010 | Croes | E04H 12/085 52/651.01 |
| 2010/0242406 | A1 | 9/2010 | Oliphant et al. | |
| 2011/0140439 | A1 | 6/2011 | Ramanujam | |
| 2011/0265419 | A1 | 11/2011 | De Abreu | |
| 2014/0245671 | A1 | 9/2014 | Sritharan et al. | |
| 2015/0071711 | A1 | 3/2015 | Wong et al. | |

FOREIGN PATENT DOCUMENTS

| | | |
|---|---|---|
| BR | 8302710 U | 6/2005 |
| CN | 201786579 U | 4/2011 |
| CN | 102536681 A | 7/2012 |
| DE | 202009005514 U1 | 4/2010 |
| EP | 2280138 A2 | 2/2011 |
| EP | 2290237 A2 | 3/2011 |
| EP | 2302136 A1 | 3/2011 |
| FR | 2907826 A1 | 5/2008 |
| WO | 9955989 A1 | 11/1999 |
| WO | 2012042309 A1 | 4/2012 |

OTHER PUBLICATIONS

Supplementary Partial European Search Report from corresponding European Application No. 13873671 dated Aug. 17, 2016.

* cited by examiner

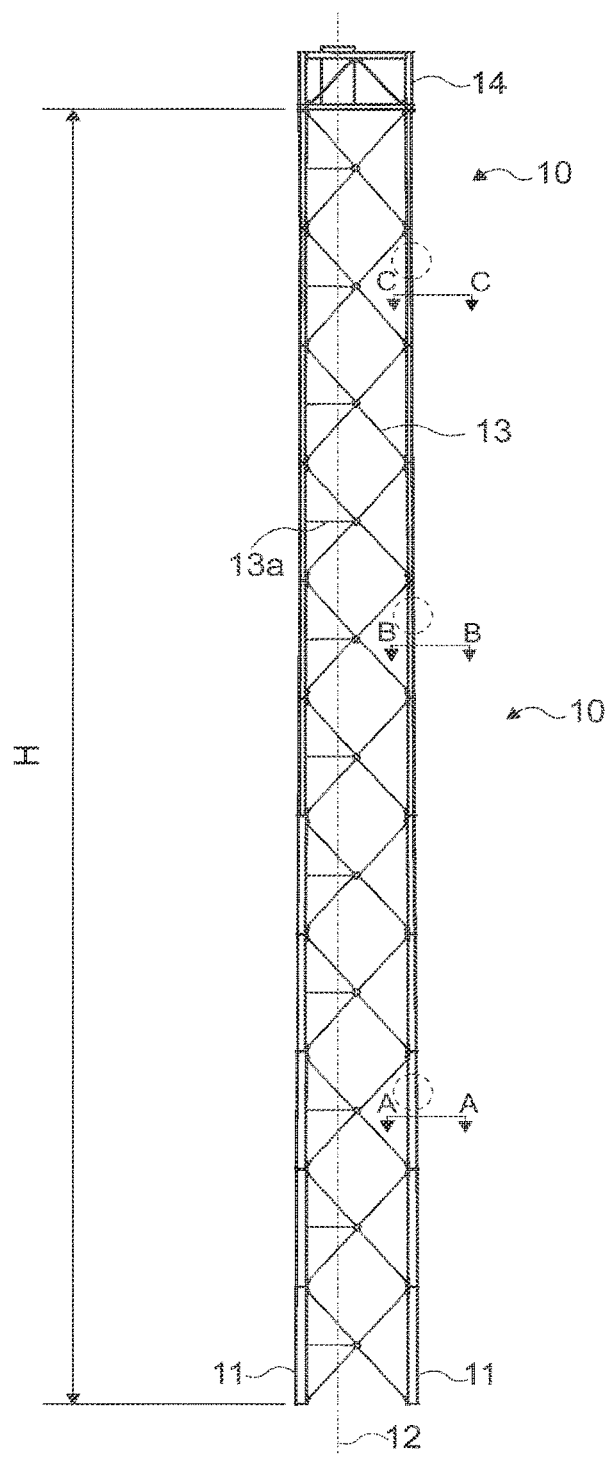
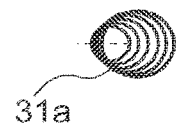
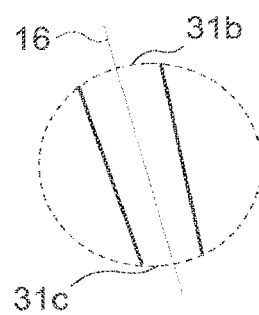
FIG. 5B     FIG. 5C
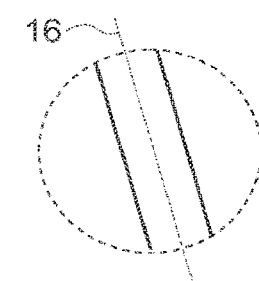
FIG. 5D     FIG. 5E
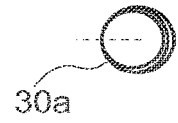
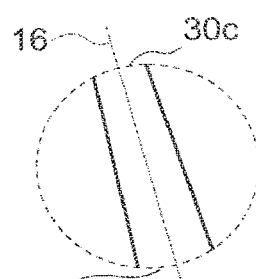
FIG. 5F     FIG. 5G
FIG. 5A

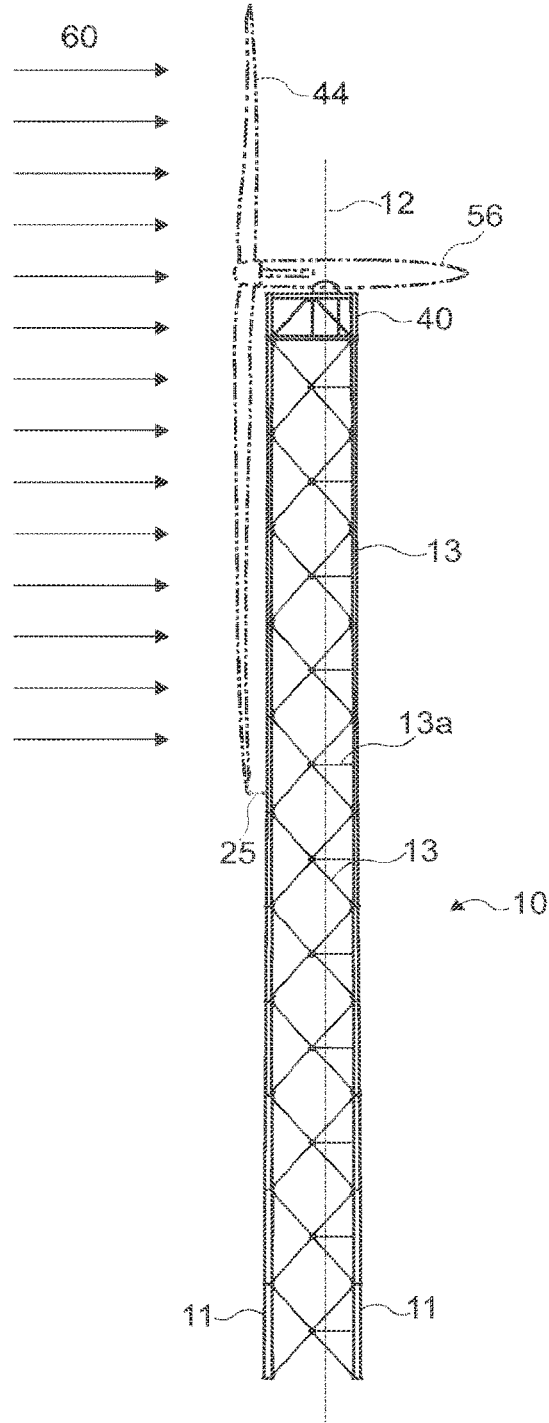
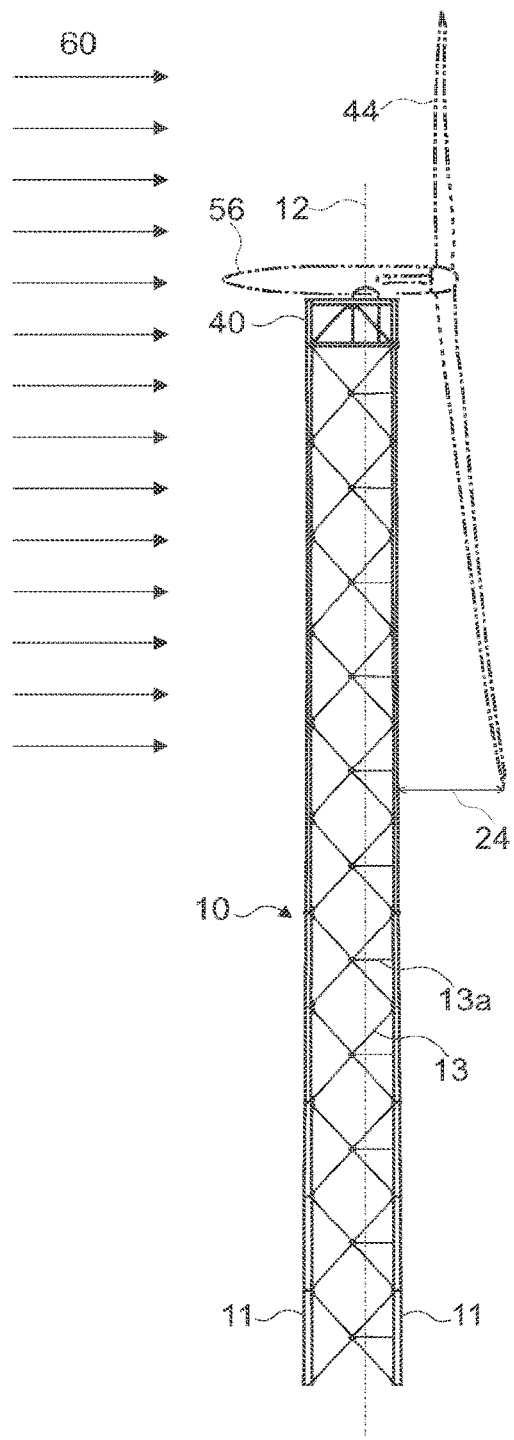
FIG. 16A
FIG. 16B

FIG. 19A

TABLE I - DIMENSIONING SPREADSHEET OF AN EXEMPLARY EMBODIMENT OF THE INVENTION - TOWER IN STEEL

| Modules | Tower height (H) | | Lenght of legs | | Thickness of legs (t) | | Distance between Central axis of legs | | Average diameter of leg (D) | | D/t | Mass of three legs | |
|---|---|---|---|---|---|---|---|---|---|---|---|---|---|
| | m | ft | m | ft | m | in | m | ft | m | ft | | kg | lb |
| Top | | | | | | | $A_t$=11.218 | 36,795 | | | | | |
| 12$^{th}$ | 138.0 | 452.6 | 6.0 | 19.7 | 0.01588 | 5/8 | 11.235 | 36,851 | 0.598 | 1.960 | 37.6 | 4,099 | 9,017 |
| 11$^{th}$ | 132.0 | 433.0 | 12.0 | 39.4 | 0.01270 | 1/2 | 11.286 | 37,018 | 0.545 | 1.788 | 42.9 | 6,002 | 13,204 |
| 10$^{th}$ | 120.0 | 393.6 | 12.0 | 39.4 | 0.01270 | 1/2 | 11.354 | 37,241 | 0.510 | 1.673 | 40.2 | 5,607 | 12,336 |
| 9$^{th}$ | 108.0 | 354.2 | 12.0 | 39.4 | 0.01588 | 5/8 | 11.422 | 37,464 | 0.510 | 1.673 | 32.1 | 6,964 | 15,321 |
| 8$^{th}$ | 96.0 | 314.9 | 12.0 | 39.4 | 0.01905 | 3/4 | 11.490 | 37,687 | 0.510 | 1.673 | 26.8 | 8,303 | 18,267 |
| 7$^{th}$ | 84.0 | 275.5 | 12.0 | 39.4 | 0.01905 | 3/4 | 11.558 | 37,910 | 0.545 | 1.788 | 28.6 | 8,895 | 19,570 |
| 6$^{th}$ | 72.0 | 236.2 | 12.0 | 39.4 | 0.01905 | 3/4 | 11.626 | 38,133 | 0.615 | 2.017 | 32.3 | 10,079 | 22,174 |
| 5$^{th}$ | 60.0 | 196.8 | 12.0 | 39.4 | 0.01905 | 3/4 | 11.694 | 38,356 | 0.685 | 2.247 | 36.0 | 11,263 | 24,779 |
| 4$^{th}$ | 48.0 | 157.4 | 12.0 | 39.4 | 0.01905 | 3/4 | 11.762 | 38,579 | 0.755 | 2.476 | 39.6 | 12,447 | 27,383 |
| 3$^{rd}$ | 36.0 | 118.1 | 12.0 | 39.4 | 0.01905 | 3/4 | 11.830 | 38,802 | 0.825 | 2.706 | 43.3 | 13,631 | 29,988 |
| 2$^{nd}$ | 24.0 | 78.7 | 12.0 | 39.4 | 0.01905 | 3/4 | 11.898 | 39,025 | 0.895 | 2.936 | 47.0 | 14,815 | 32,593 |
| 1$^{st}$ | 12.0 | 39.4 | 12.0 | 39.4 | 0.02223 | 7/8 | 11.966 | 39,248 | 0.965 | 3.165 | 43.4 | 18,603 | 40,926 |
| Base | | | | | | | $A_b$=12.000 | 39,360 | | | | | |

| TABLE I - DIMENSIONING SPREADSHEET OF AN EXEMPLARY EMBODIMENT OF THE INVENTION - TOWER IN STEEL | | | | | | |
|---|---|---|---|---|---|---|
| | BRACING MEMBERS | | | | | |
| | Bracing members diameter | | Thickness of bracing member | | Mass of bracing members (steel and reinforced concrete) | |
| Modules | m | ft | m | in | kg | lb |
| Top | | | | | | |
| 12th | 0,2190 | 0,718 | 0,00794 | 5/16 | 1.904 | 4.189 |
| 11th | 0,2190 | 0,718 | 0,00794 | 5/16 | 3.834 | 8.435 |
| 10th | 0,2190 | 0,718 | 0,00794 | 5/16 | 3.856 | 8.484 |
| 9th | 0,2190 | 0,718 | 0,00794 | 5/16 | 3.868 | 8.509 |
| 8th | 0,2190 | 0,718 | 0,00794 | 5/16 | 3.880 | 8.535 |
| 7th | 0,2190 | 0,718 | 0,00794 | 5/16 | 3.879 | 8.534 |
| 6th | 0,2190 | 0,718 | 0,00794 | 5/16 | 3.866 | 8.505 |
| 5th | 0,2190 | 0,718 | 0,00794 | 5/16 | 3.853 | 8.477 |
| 4th | 0,2190 | 0,718 | 0,00794 | 5/16 | 3.841 | 8.449 |
| 3rd | 0,2190 | 0,718 | 0,00794 | 5/16 | 3.828 | 8.421 |
| 2nd | 0,2190 | 0,718 | 0,00794 | 5/16 | 3.815 | 8.393 |
| 1st | 0,2190 | 0,718 | 0,00794 | 5/16 | 3.802 | 8.365 |
| Base | | | | | | |

FIG. 19B

TABLE II - DIMENSIONING SPREADSHEET OF AN EXEMPLARY EMBODIMENT OF THE INVENTION - TOWER IN STEEL AND REINFORCED CONCRETE

| Modules | Tower height (H) | | Lenght of legs | | Thickness of legs (t) | | Distance between Central axis of legs | | Average diameter of leg (D) | | Number of concrete reinforcing bars for three legs | Diameter of concrete reinforcing bars for three legs | | D/t | Mass of three legs | |
|---|---|---|---|---|---|---|---|---|---|---|---|---|---|---|---|---|
| | m | ft | m | ft | m | in | m | ft | m | ft | | m | in | | kg | lb |
| Top | | | | | | | $A_t$=11.218 | 36.795 | | | | | | | | |
| 12th | 138.0 | 452.6 | 6.0 | 19.7 | 0.00953 | 3/8 | 11.235 | 36.851 | 0.598 | 1.960 | 57 | 0.0191 | 3/4 | 62.7 | 13.907 | 30.595 |
| 11th | 132.0 | 433.0 | 12.0 | 39.4 | 0.00635 | 1/4 | 11.286 | 37.018 | 0.545 | 1.788 | 18 | 0.0191 | 3/4 | 85.8 | 21.804 | 47.970 |
| 10th | 120.0 | 393.6 | 12.0 | 39.4 | 0.00635 | 1/4 | 11.354 | 37.241 | 0.510 | 1.673 | 18 | 0.0191 | 3/4 | 80.3 | 19.264 | 42.380 |
| 9th | 108.0 | 354.2 | 12.0 | 39.4 | 0.00635 | 1/4 | 11.422 | 37.464 | 0.510 | 1.673 | 45 | 0.0191 | 3/4 | 80.3 | 19.776 | 43.508 |
| 8th | 96.0 | 314.9 | 12.0 | 39.4 | 0.00953 | 3/8 | 11.490 | 37.687 | 0.510 | 1.673 | 27 | 0.0191 | 3/4 | 53.5 | 20.419 | 44.922 |
| 7th | 84.0 | 275.5 | 12.0 | 39.4 | 0.00953 | 3/8 | 11.558 | 37.910 | 0.545 | 1.788 | 36 | 0.0191 | 3/4 | 57.2 | 23.201 | 51.041 |
| 6th | 72.0 | 236.2 | 12.0 | 39.4 | 0.00953 | 3/8 | 11.626 | 38.133 | 0.615 | 2.017 | 54 | 0.0191 | 3/4 | 64.6 | 29.241 | 64.331 |
| 5th | 60.0 | 196.8 | 12.0 | 39.4 | 0.01270 | 1/2 | 11.694 | 38.356 | 0.685 | 2.247 | 27 | 0.0191 | 3/4 | 53.9 | 36.386 | 80.049 |
| 4th | 48.0 | 157.4 | 12.0 | 39.4 | 0.01270 | 1/2 | 11.762 | 38.579 | 0.755 | 2.476 | 36 | 0.0191 | 3/4 | 59.4 | 43.670 | 96.074 |
| 3rd | 36.0 | 118.1 | 12.0 | 39.4 | 0.01270 | 1/2 | 11.830 | 38.802 | 0.825 | 2.706 | 36 | 0.0191 | 3/4 | 65.0 | 51.420 | 113.125 |
| 2nd | 24.0 | 78.7 | 12.0 | 39.4 | 0.01270 | 1/2 | 11.898 | 39.025 | 0.895 | 2.936 | 39 | 0.0191 | 3/4 | 70.5 | 59.865 | 131.703 |
| 1st | 12.0 | 39.4 | 12.0 | 39.4 | 0.01270 | 1/2 | 11.966 | 39.248 | 0.965 | 3.165 | 114 | 0.0191 | 3/4 | 76.0 | 70.314 | 154.691 |
| Base | | | | | | | $A_0$=12.000 | 39.360 | | | | | | | | |

FIG. 20A

| TABLE II - DIMENSIONING SPREADSHEET OF AN EXEMPLARY EMBODIMENT OF THE INVENTION - TOWER IN STEEL AND REINFORCED CONCRETE ||||||
|---|---|---|---|---|---|
| | BRACING MEMBERS |||||
| | Bracing members diameter || Thickness of bracing member || Mass of bracing members (steel and reinforced concrete) ||
| Modules | m | ft | m | in | kg | lb |
| Top | | | | | | |
| 12th | 0,2190 | 0,718 | 0,00476 | 3/16 | 2.406 | 5.294 |
| 11th | 0,2190 | 0,718 | 0,00476 | 3/16 | 4.845 | 10.660 |
| 10th | 0,2190 | 0,718 | 0,00476 | 3/16 | 4.874 | 10.722 |
| 9th | 0,2190 | 0,718 | 0,00476 | 3/16 | 4.888 | 10.754 |
| 8th | 0,2190 | 0,718 | 0,00476 | 3/16 | 4.903 | 10.786 |
| 7th | 0,2190 | 0,718 | 0,00476 | 3/16 | 4.902 | 10.785 |
| 6th | 0,2190 | 0,718 | 0,00476 | 3/16 | 4.886 | 10.749 |
| 5th | 0,2190 | 0,718 | 0,00476 | 3/16 | 4.870 | 10.713 |
| 4th | 0,2190 | 0,718 | 0,00476 | 3/16 | 4.854 | 10.678 |
| 3rd | 0,2190 | 0,718 | 0,00476 | 3/16 | 4.837 | 10.642 |
| 2nd | 0,2190 | 0,718 | 0,00476 | 3/16 | 4.821 | 10.607 |
| 1st | 0,2190 | 0,718 | 0,00476 | 3/16 | 4.805 | 10.572 |
| Base | | | | | | |

FIG. 20B

| TABLE III - COST, MASS AND FREQUENCY COMPARISON BETWEEN A MONOPOLE AND THE TWO EXAMPLARY EMBODIMENTS OF THE PRESENT INVENTION | | | | | | |
|---|---|---|---|---|---|---|
| Tower | Cost($) | Mass (ton) | | Frequence (Hz) | | |
| | | Steel | Concret | 1$^{st}$ mode | 2$^{nd}$ mode | 3$^{rd}$ mode |
| Monopole (TM1) | 301% | 241%<br>402,5 | - | 51%<br>0,151 | 107%<br>1,019 | 94%<br>2,034 |
| Lattice Tower in steel only (TA1) | Reference (100%) | 100%<br>167,0 | - | 100%<br>0,297 | 100%<br>0,955 | 100%<br>2,175 |
| Lattice Tower in steel and reinforced concrete (TAC1) | 61% | 59%<br>99,2 | 367,969 | 128%<br>0,381 | 98%<br>0,934 | 85%<br>1,844 |

FIG. 21

LATTICE TOWER

CROSS-REFERENCE TO RELATED APPLICATIONS

This application is a continuation under 35 U.S.C. § 120 of U.S. patent application Ser. No. 14/765,245 titled "LATTICE TOWER", filed Jul. 31, 2015, which is a U.S. National Stage Application under 35 U.S.C. § 371 of International Application No. PCT/BR2013/000036, filed Feb. 1, 2013, each of which is hereby incorporated herein by reference in its entirety.

BACKGROUND OF THE INVENTION (US)

Technical Field

This invention relates to lattice tower for actuate under high load conditions, more particularly to lattice towers utilized for wind turbines and other applications.

Background Art

Vertical structures for supporting high loads such as towers or the like utilized for supporting wind turbines, power transmission lines and other applications are well known in the prior art. The structural designs, components and materials of such vertical structures vary depending upon the application.

One type of vertical structure that has been receiving special attention in the last decades are the vertical structures for wind turbines or other high loads.

Wind energy has become a very attractive source of energy, both due to an increase in efficiency of the generators and an increase in market demand for clean and renewable sources of energy. The increase of the efficiency of the wind energy generators is related to a great effort in enhancing several aspects of the technology, including many issues related to the design and manufacturing of the wind energy generator components including, among others, the rotor blades, the electrical generator, the tower and the control systems.

Most wind turbines used in megawatt applications, nowadays varying in the range of about 1 MW to 5 MW, have a horizontal-axis wind turbine (HAWT) configuration with a main rotor shaft and an electrical generator at the top of a tower, and the rotor axis directioned to the inflow of the wind with three-blades positioned upwind.

The main advantage of the upwind design is the avoidance of the wind shade and resulting turbulence behind the tower. Currently, most of large scale wind turbines adopt the upwind design; however, this design has various drawbacks such as the need of some distance between the tower and the blades due to the bending of the blades and the need of a yaw mechanism to keep the rotor facing the wind. The yaw mechanism usually has a wind sensor associated by an electronic controller to a yaw drive, which includes one or more hydraulic or electric motors and a large gearbox for increasing the torque, as well as a yaw bearing. The yaw bearing provides a rotatable connection between the tower and the nacelle of the wind turbines. The yaw mechanism usually includes additional components, such as brakes that work in cooperation with the hydraulic or electric motors in order to avoid wear and high fatigue loads on the wind turbine components due to backlash during orientation of the rotor according to the wind direction. As the wind turbine will usually have cables that carry the electric current from the electric generator down through the tower, the cable may become twisted due to the rotation of the yaw mechanism. Therefore, the wind turbine may be equipped with a cable twist counter that is associated with the yaw mechanism electronic controller in order to determine the need of untwisting the cables by the yaw mechanism.

The downwind design, by which the rotor is placed on the lee side from which the wind blows in tower, would in principle avoid the need of a yaw mechanism if the rotor and nacelle have a suitable design that makes the nacelle follow the wind passively, utilizing the wind force in order to naturally adjust the orientation of the wind turbine in relation to the wind. This theoretical advantage is doubtful in large megawatt wind turbines because there usually remains a need to untwist the cables if the rotor continuously turns in the same direction. In addition, there are mechanical problems such as fatigue of the components due to strong loads resultant from the sudden changes of the wind direction. Nevertheless, the downwind design still presents an important advantage in regard to the structural dynamics of the machine, allowing a better balancing of the rotor and tower. In the case of larger wind turbine rotors, which nowadays have a diameter reaching about 120 meters (about 393.6 ft) or more, obtaining more flexibility in the design of the rotor blades is essential.

However, the increase of diameter of the rotor usually involves heavier rotors and the increase of the height of the tower, consequently, may involve the use of additional material, for instance, steel, for manufacturing the tower.

Hence, as a tower usually represents about fifteen to thirty percent of the cost of the wind energy generator, there is a great need to obtain higher and more robust towers at lower costs.

Most large wind turbines manufactured in the last two decades with a power output higher than one megawatt adopt tubular steel towers, commonly referred to as "monopoles", as the preferred choice. The monopoles usually taper from the base to the top or close to the top, having modules connected together with bolted flanges. A constraint related with monopoles is the road transportation limitations that restrict the diameter of the segments. For instance, tubular segments with diameters higher than about 4 meters (about 13 feet) may not be transported on roads in many countries.

Lattice towers usually need less material (e.g. less steel) than monopoles, but require a higher number of components and bolted connections. These bolted connections are subject to the varying fatigue loads, hence, they have the disadvantage of higher maintenance needs.

Disclosure Technical Problem

One particular technical problem regarding vertical structures such as towers or the like utilized for supporting high loads such as large wind turbine generators is the lack of balancing between the stress and strain distribution of the vertical and horizontal loads vectors along the extension of the vertical structure. Due to this lack of balancing, the tower segments are designed with significant losses of materials in some segments or with assemblies that result in complex manufacturing, transportation and installations requirements.

Other problems to be considered are the low natural frequencies of modes of bending and torsion, and the level of vibration and trepidation that the wind causes in the tower.

Likewise, regardless of the upwind or downwind design, if the rotor axis is not substantially positioned to direction of the inflow of the wind there is a so called yaw error angle, causing a lower fraction of the energy in the wind flowing through the rotor area. In general, the fraction of lost power is proportional to the cosine of yaw error angle. Moreover, the yaw error causes a larger bending torque at the portion of the rotor that is closest to the source of the wind, resulting in a tendency of the rotor to yaw against the wind and the blades bend back and forth in a flapwise (or flatwise) direction for each turn of the rotor. Therefore, on one hand adequate alignment of the wind turbine rotor in relation to the wind is essential for obtaining good wind energy extraction performance and low wind turbines components wear, while on the other hand there is a need for a low cost yaw mechanism with the advantages of the downwind design.

Technical Solution

To overcome the drawbacks and problems described above and other disadvantages not mentioned herein, in accordance with the purposes of the invention, as described henceforth, one basic aspect of the present invention is directed to a lattice tower for actuate under high load conditions.

Advantageous Effects

The present invention has several advantages over the prior art. In comparison with the vertical structures of the prior art, the present invention enables a surprising reduction in the weight of the metallic structure of about 40%, depending on the design requirements of the case. One of the reasons for such expressive reduction in the total weight of the structure is that each leg of the vertical structure has a stress and strain behavior similar to a monopole, without having the restrictions of the large diameter of the single monopole vertical structures. The reduction of the weight of the metallic structure is accompanied by an advantageous reduction of the total costs of the structure, including the costs of manufacturing, transport and installation.

The advantage of weight reduction is accompanied by further manufacturing, transportation and installation advantages, as well as availability of a new class of vertical structures for high and critical applications, such as wind energy turbines with a power output higher than 3 MW with towers higher than 100 meters (higher than 328 feet).

Furthermore, another aspect of one embodiment of the invention allows the vertical and horizontal alignment of the rotor, without constant need of full force of the yaw mechanism, while also absorbing and providing damping effect for bursts winds or extreme winds.

Furthermore, another aspect of one embodiment of the invention provides a large platform in relation to the size of a standard nacelle permitting the use of alternative tower design with low shadow wind and turbulence for downwind application, resulting in significant flexibility in the design of blades, substantially reducing the costs and improving performance.

DESCRIPTION OF DRAWINGS

The above and other exemplary aspects and/or advantages will become more apparent by describing in detail exemplary embodiments with reference to the accompanying drawings, which are not necessarily drawn on scale. In the drawings, some identical or nearly identical components that are illustrated in various figures can be represented by a corresponding numeral.

For purposes of clarity, not every component can be labeled in every drawing.

FIG. 5A is a side view of one exemplary of a lattice tower according to one embodiment of this invention, serving as reference to show the different configurations of the cross-sections of the tower legs along its height.

FIG. 5B is a cross-section view of the legs along the third portion length of the lattice tower (with the inclination and conicity exaggerated, as well as not in scale), according to one embodiment of this invention.

FIG. 5C is a partial schematic view of the leg along the third portion length of the lattice tower (with the inclination and conicity enlarged exaggerated, as well as not in scale), according to one embodiment of this invention.

FIG. 5D is a cross-section view of the legs along the second portion length of the lattice tower (with the inclination and conicity enlarged as well as not in scale), according to one embodiment of this invention.

FIG. 5E is a partial schematic view of the leg along the second portion length of the lattice tower (with the inclination and conicity exaggerated, as well as not in scale), according to one embodiment of this invention.

FIG. 5F is a cross-section of the legs along the first portion length of the lattice tower (with the inclination and conicity enlarged as well as not in scale), according to one embodiment of this invention.

FIG. 5G is a partial schematic view of the leg along the first portion length of the lattice tower (with the inclination and conicity exaggerated, as well as not in scale), according to one embodiment of this invention.

FIG. 16A is a lateral view of one exemplary of one embodiment of this invention wherein the load is a upwind turbine assembly with elongated nacelle.

FIG. 16B is a lateral view of one exemplary of one embodiment of this invention wherein the load is a downwind turbine assembly with elongated nacelle.

FIGS. 19A and 19B show the Table I corresponding to the dimensioning spreadsheet of a tower in steel only according to one embodiment of the present invention.

FIGS. 20A and 20B show the Table II corresponding to the dimensioning spreadsheet of a tower in steel reinforced with concrete according to one embodiment of the present invention.

FIG. 21 shows in the Table III the summary of the comparison between three towers: the monotubular tower, the lattice tower in steel, and the lattice tower in steel reinforced with concrete.

EXPLANATIONS OF LETTERS AND NUMERALS

Figure 1:
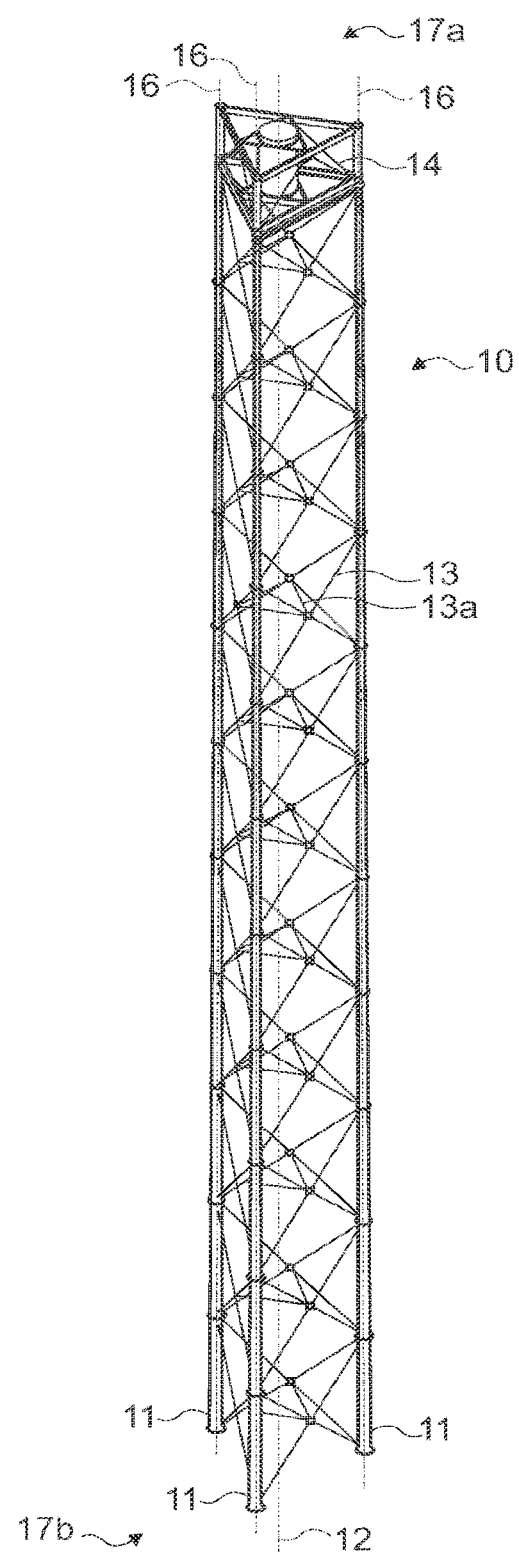
FIG. 1 shows a perspective view of one exemplary of a lattice tower for supporting loads according to one embodiment of this invention.

| Numerals | Explanation of numerals |
|---|---|
| 10 | Lattice tower |
| 11 | Metallic legs |
| 12 | Vertical axis of the tower |
| 13 | Bracing members |
| 13a | Auxiliary bracing members |
| 14 | Support platform |
| 16 | Central longitudinal axis |
| 17a | Top portion (of lattice tower assembled) |
| 17b | Base portion (of lattice tower assembled) |
| 18 | Flange of linkage |
| 20 | Module |
| 21a | First portion |
| 21b | First legs |
| 22a | Second portion |
| 22b | Second legs |
| 23a | Third portion |
| 23b | Third legs |
| 24 | Clearance upwind distance |
| 25 | Clearance downwind distance |
| 26 | Channel with reduced web |
| 27 | Oblong aerodynamic profile |
| 30a | A frusto-conical cross-section first leg |
| 30b | Bottom portion of first leg |
| 30c | Top portion of first leg |
| 31a | A frusto-conical cross-section third leg |
| 31b | Top portion of third leg |
| 31c | Bottom portion of third leg |
| 40 | Support platform with inner tubular interface |
| 41 | Platform leg |
| 42 | Inner tubular interface |
| 43 | Yaw mechanism support structure |
| 44 | Rotor blades |
| 45 | Electric generator |
| 46 | Body |

-continued

| Numerals | Explanation of numerals |
|---|---|
| 47 | Upper surface |
| 48 | Lower surface |
| 49 | Circular track |
| 50 | Yaw rotating mechanism |
| 51 | First axis that is perpendicular to the upper surface of the platform |
| 52 | Longeron of turbine support platform |
| 53 | First end turbine support platform frame |
| 54 | Second end turbine support platform frame |
| 55 | Second axis that is perpendicular to the first axis |
| 56 | Wind energy turbine with elongated nacelle |
| 57 | Yaw actuator |
| 58 | Wheels |
| 58a | Dampener element |
| 60 | Wind direction |
| 61 | Interface |
| 61a | Second Interface |
| 63 | Gearbox |
| 64 | Passageway for cables |
| 65 | Shaft |
| 66 | Furling mechanism |

MODES FOR INVENTION

Hereinafter, exemplary embodiments will be described with reference to the attached drawings. Like reference numerals in the drawings denote like elements. While exemplary embodiments are described herein, they should not be construed as being limited to the specific descriptions set forth herein; rather, these embodiments are provided so that this disclosure will be thorough and complete. In the drawings, the sizes of components may be exaggerated or made smaller for purposes of clarity.

The phraseology and terminology used herein is for the purpose of description and should not be regarded as limiting. The use of "including", "comprising", "having", "containing" or "involving", and variations thereof used in this description, is meant to encompass the items listed thereafter and equivalents thereof as well as additional items. The dimensions as recited herein are merely exemplary and other dimensions may be used in conjunction with the exemplary embodiments as would be understood by one of skill in the art.

FIG. 1, which is on an approximate scale, shows a perspective view of an exemplary lattice tower 10, higher than 60 meters (about 197 ft), according to one embodiment of the present invention. The lattice tower 10 is formed by three metallic legs 11, configurated in metallic shells, which have their central longitudinal axis 16 inclined in relation to the vertical axis 12 of the lattice tower 10. At the foundation, in base portion 17b, the three legs 11 are arranged in an equilateral triangular configuration around the vertical axis 12 of the tower, in a distance greater than 4 meters measured between the centers 16 of each leg of the lattice tower 10. The metallic legs 11 have a substantially circular and closed cross-section and are connected to each other along the lattice tower 10 structure height by a plurality of bracing members 13 and auxiliary bracing members 13a which are arranged diagonally and horizontally, respectively. A support platform 14 is disposed at the top portion 17a of the lattice tower 10 serving as an interface for supporting loads like wind turbine, electric power transmission lines, telecommunications systems, and other applications.

Figures 2A, 2B:
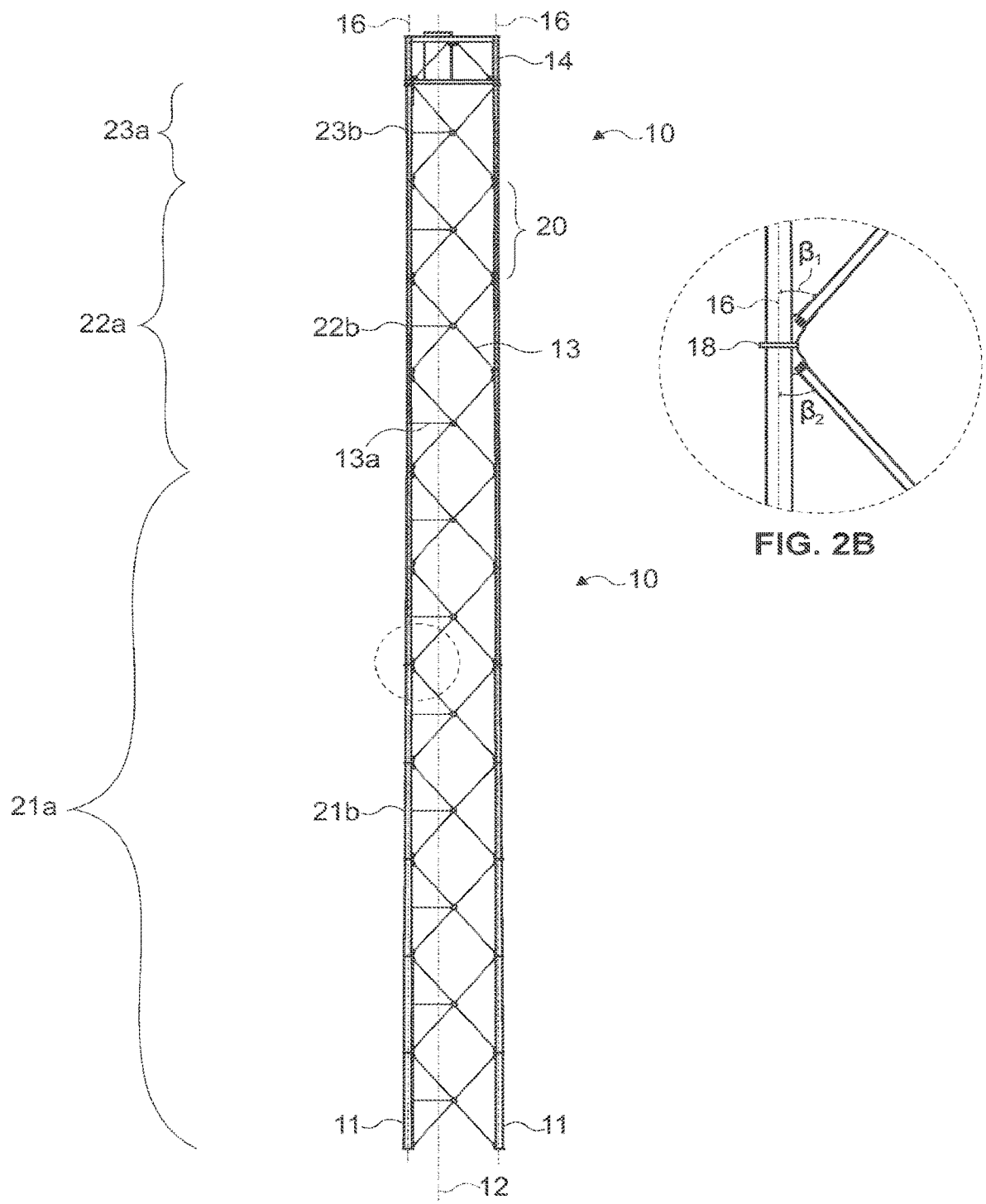
FIG. 2A is a side view of one exemplary of a lattice tower according to one embodiment of this invention.
FIG. 2B is a partial detailed view of the inclination at (31 and (32 angles of the bracing members in relation to the central axis of each one of the lattice tower legs, according to one embodiment of this invention.

FIG. 2A is a side view of one exemplary embodiment of the invention showing the silhouette (the vertical profile) of the lattice tower 10 wherein its metallic legs 11 are divided in three portions: a first portion 21a, a second portion 22a and a third portion 23a. The first portion 21a and the third portion 23a have two inverted right circular truncated conical shape which are interconnected, at their narrow end, by the second portion 22a which has cylindrical shape of smaller diameter. All portions are aligned through its central longitudinal axis 16.

FIG. 2A shows also a plurality of bracing members 13 and auxiliary bracing members 13a, arranged diagonally and horizontally, respectively, and attached to the metallic legs 11 of the lattice tower 10 at regular intervals along the length of the metallic legs 11, having the function of providing resistance to lateral and/or rotational displacement to stiffen the lattice tower 10. The construction of said bracing members 13, especially the diagonal ones which are constructed in the interior of the lattice tower 10 in a X-shaped format, are made up in a configuration inclined in a β1 and β2 angle in relation to the central longitudinal axis 16 of each metallic leg 11, as depicted in FIG. 2B. Although the angles β1 and β2 are not necessarily identicals and may vary according to the position of the bracing member 13 along the height of the lattice tower 10, said angles have values between about 30 and 60 degrees, preferably around 45 degrees. The side view shown in FIG. 2A, illustrates also the three metallic legs 11 of the lattice tower 10 wherein the metallic legs are divided in three portions along its length, each portion formed preferentially by at least one module or module 20. This division is according to the assembly of the tower considering its inverted truncated conical portions and cylindrical portion, as well as is intended to provide a better understanding of its design function, as previously described.

The first portion 21a is formed by three first legs 21b, the second portion 22a which is formed by second legs 22b, each second leg 22b, preferentially, is linearly aligned with and coupled to a corresponding first leg 21b of the first portion 21a. A third portion 23a includes three third legs 23b, each third leg 23b, preferentially, is linearly aligned with and coupled to a corresponding second leg 22b of the second portion 22a.

Figure 3A:
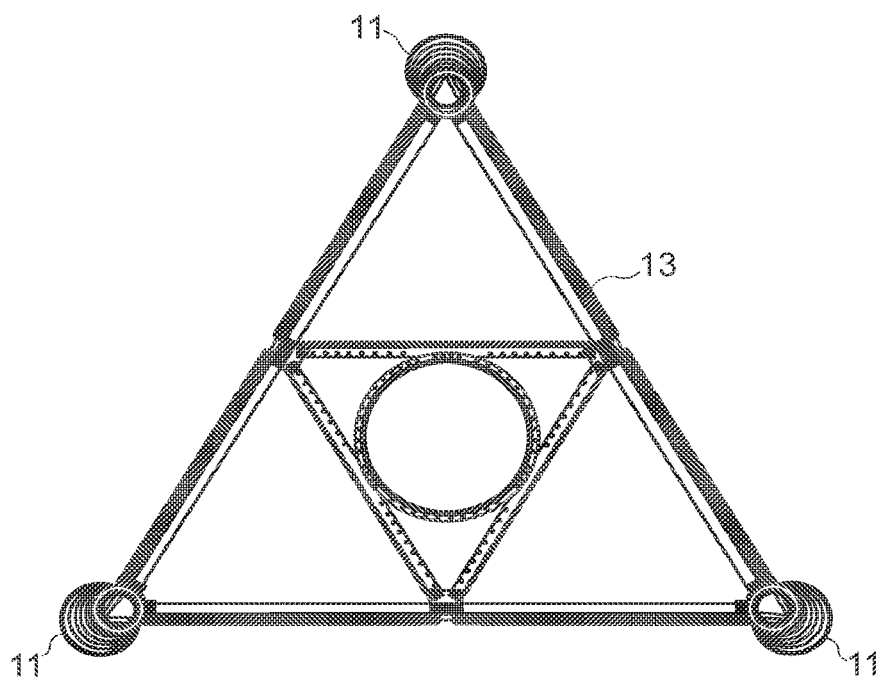
FIG. 3A is a top view of the lattice tower, according to one embodiment of this invention.

The FIG. 3A is a top view of the lattice tower, according to one embodiment of this invention, which helps to understand the three metallic legs 11 shape having two inverted right circular truncated conical shape which are interconnected, at their narrow end.

Figure 3B:
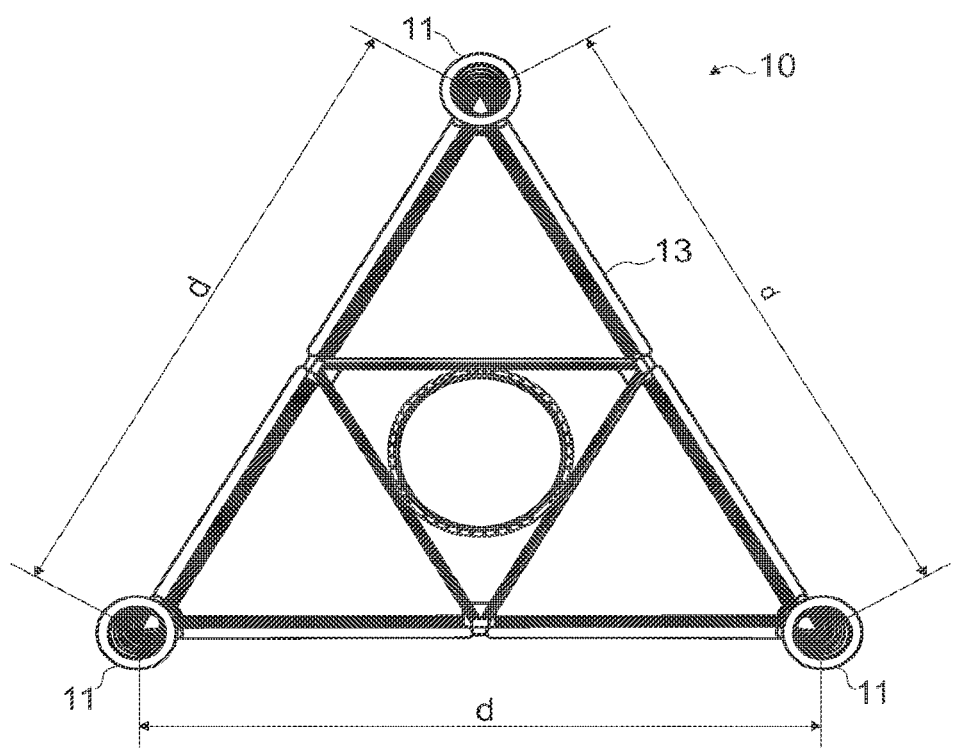
FIG. 3B is a bottom view of the lattice tower, according to one embodiment of this invention.

As depicted in the FIG. 3B, the three metallic legs 11 are arranged symmetrically at equal angles around a vertical axis of the tower 12 and with equal distances "d" between each other, in a triangular configuration, preferably in an equilateral configuration. Eventually, small variations due to the geometric dimensioning and tolerances that may be considered for the assembly, for instance due manufacturing or land and foundation limitations. The distance "d" between the central longitudinal axes 16 of each leg in the bottom portion 17b of the lattice tower base when fixed to the ground, is greater than 4 meters (about 13.12 ft).

Figure 4:
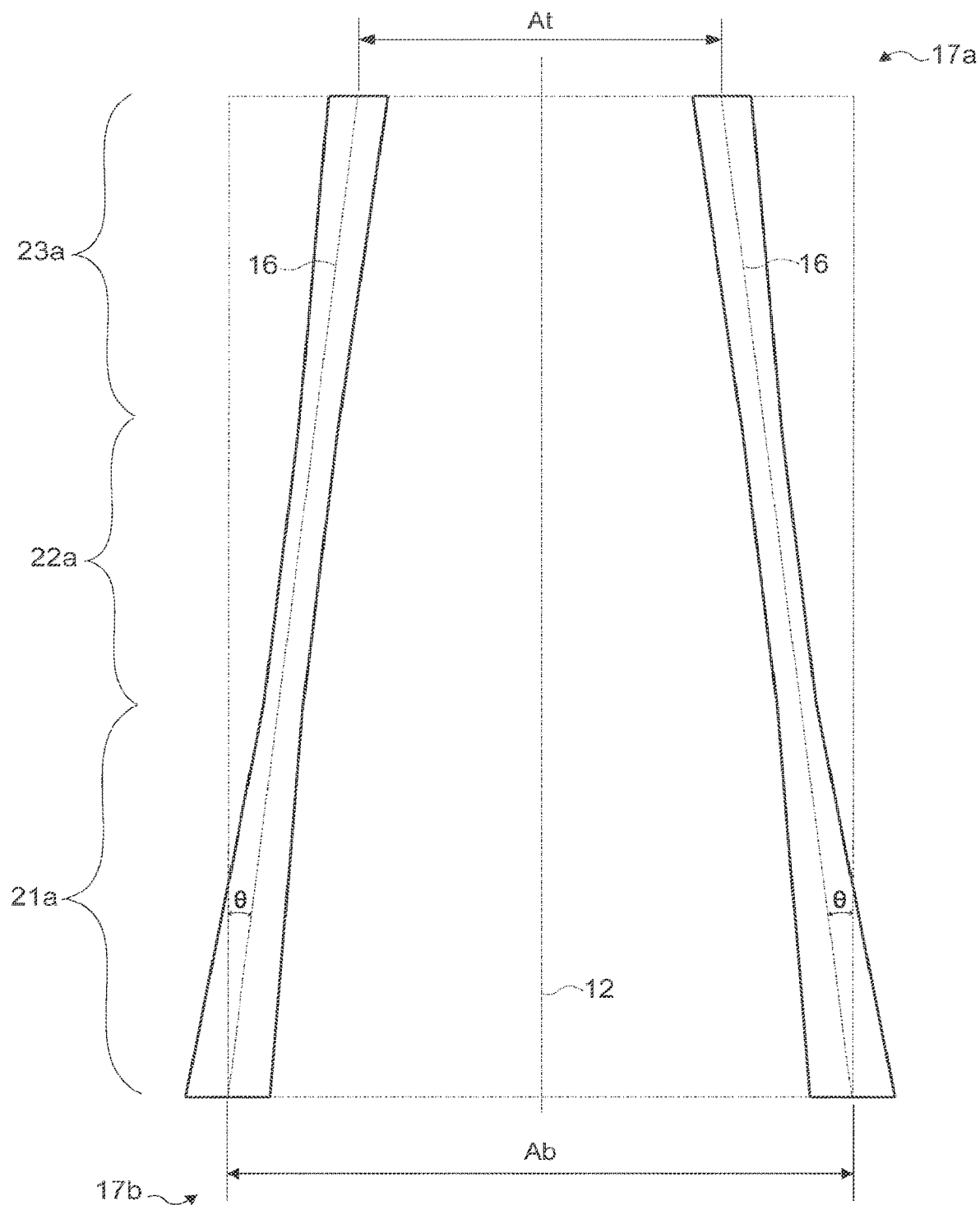
FIG. 4 is a partial schematic exaggerated view of the inclination between the central longitudinal axes, the vertical axis of the tower and the leg's conicity, according to one embodiment of this invention.

FIG. 4 is a partial schematic view of the inclination between the central longitudinal axis and the vertical axis of the tower, according to one embodiment of this invention. The scale of this view has been exaggerated for clarity. In the example, the central longitudinal axis 16 of each metallic leg 11 can be inclined until an angle (θ) of 1.7 degree in relation to the vertical axis of the lattice tower 10 and around the central longitudinal axis 16 in accordance to the characteristics of load it is intended for, like wind turbine, electric power transmission lines, and other applications.

Additionally, the lattice tower 10 is configured to provide a general aspect of the vertical profile (silhouette) wherein in an exaggerated scale the tower would have an hourglass-shape that defines the lower portion of the tower relatively broad at its lower end (distance "Ab" in the base portion 17b) and relatively narrow at its upper end (distance "At" in the top portion 17b), as depicted in FIG. 4, but in fact in a true scale the general aspect of the vertical profile (silhouette) would appear to be linearly vertical at right angles. Furthermore, as depicted from FIG. 04, the distance "At" is, preferentially, lower than the distance "Ab".

The tower configuration shown in FIG. 4, is suitable to ensure a proper distribution of the efforts that are caused by loading the lattice tower 10 once this type of silhouette allows reinforcing the top portion 23a of the metallic legs 11 with diameters and thicknesses larger than normally found in prior art. Also, this configuration allows a double effect in terms of structure once that increases the strength and the natural frequency of the tower and at the same time reduces its manufacturing, transport and installation costs. In addition, the portions 22a and 23a, as depicted in FIG. 2A, are especially suitable to reduce the aerodynamic turbulence in the region where the rotor blades passes, allowing the use of a downwind configuration as shown in FIG. 16B. The downwind design, as shown in FIG. 16B, is very advantageous because the clearance 24 is not a problem while the blade 44 bends deviating from the lattice tower 10 in this wind condition.

Figure 15A:
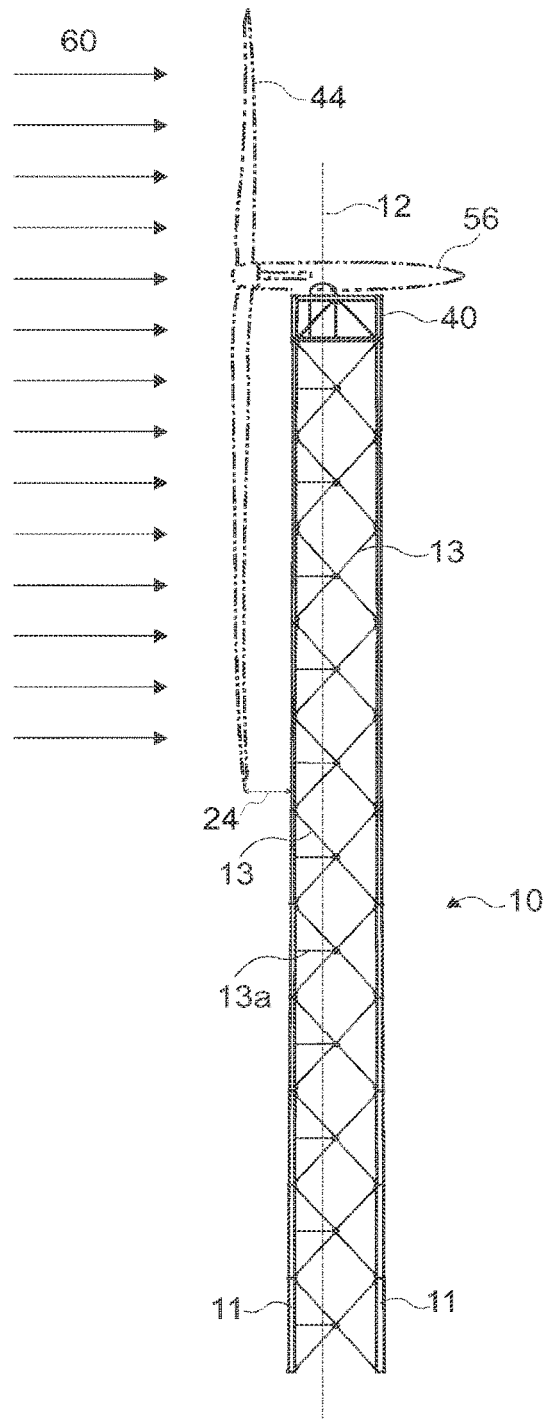
FIG. 15A is a lateral view of one exemplary of one embodiment of this invention wherein the load is an upwind turbine assembly with elongated nacelle.
Figure 15B:
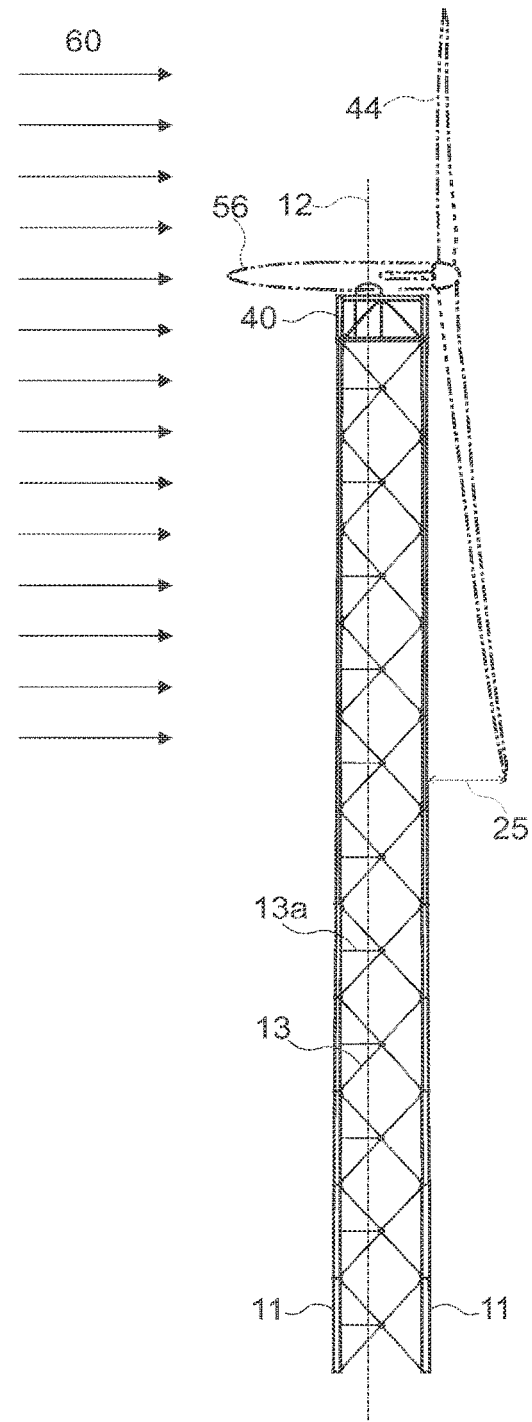
FIG. 15B is a lateral view of one exemplary of one embodiment of this invention wherein the load is an downwind turbine assembly with elongated nacelle.
Figure 17A:
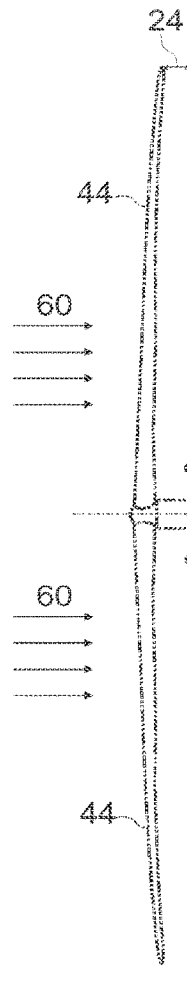
FIG. 17A is a top view of one exemplary of one embodiment of this invention wherein the load is a upwind turbine assembly with elongated nacelle.
Figure 17B:
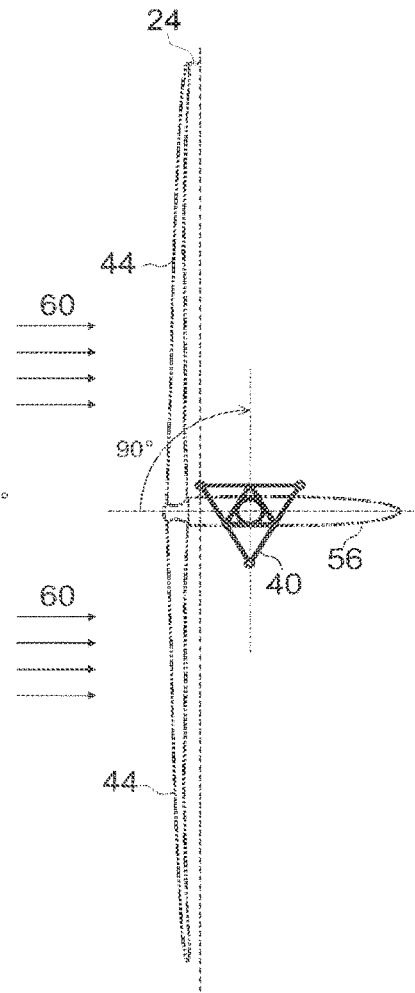
FIG. 17B is a top view of one exemplary of one embodiment of this invention wherein the load is a upwind turbine assembly with elongated nacelle, rotated by 90° with respect to the configuration of FIG. 17A.
Figure 17C:
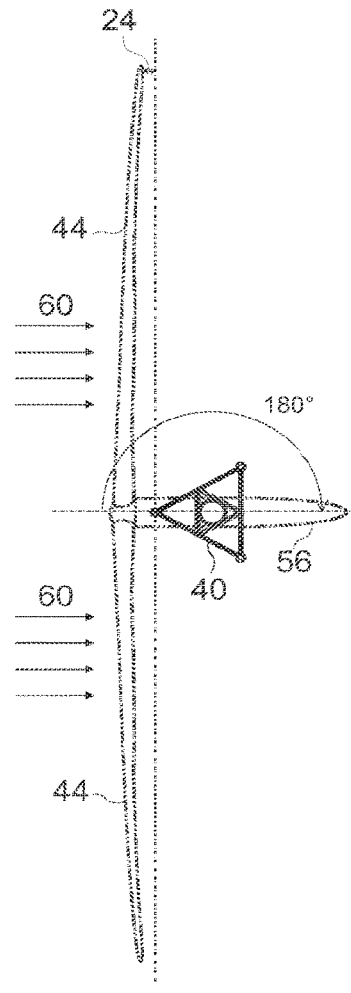
FIG. 17C is a top view of one exemplary of one embodiment of this invention wherein the load is a upwind turbine assembly with elongated nacelle, rotated by 180° with respect to the configuration of FIG. 17A.
Figure 18A:
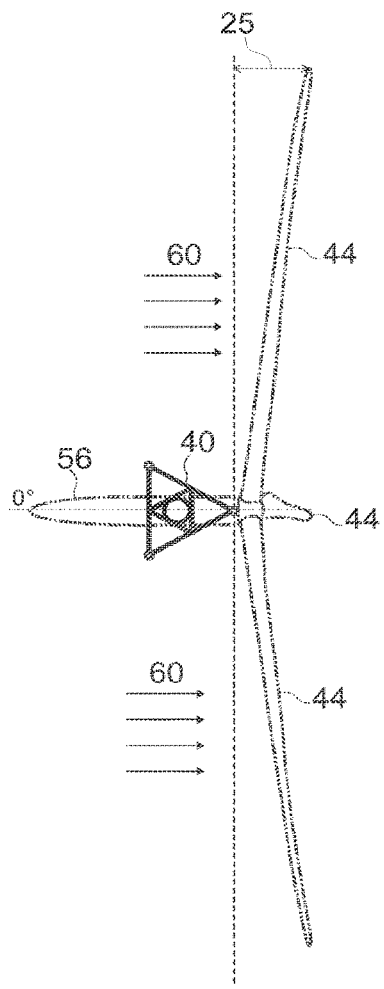
FIG. 18A is a top view of one exemplary of one embodiment of this invention wherein the load is a upwind turbine assembly with elongated nacelle.
Figure 18B:
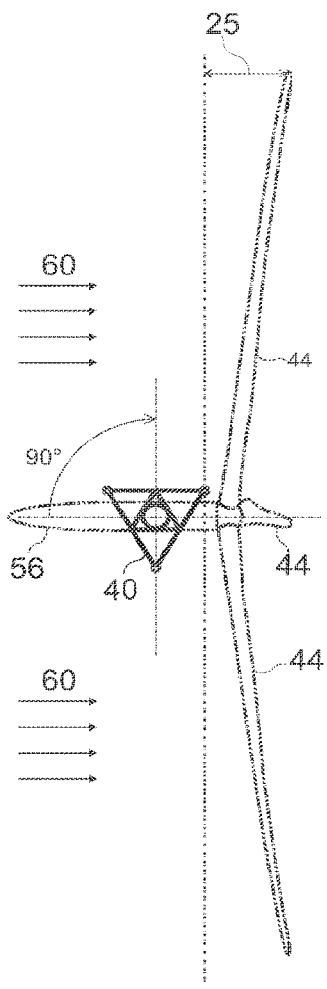
FIG. 18B is a top view of one exemplary of one embodiment of this invention wherein the load is a upwind turbine assembly with elongated nacelle, rotated by 90° with respect to the configuration of FIG. 18A.
Figure 18C:
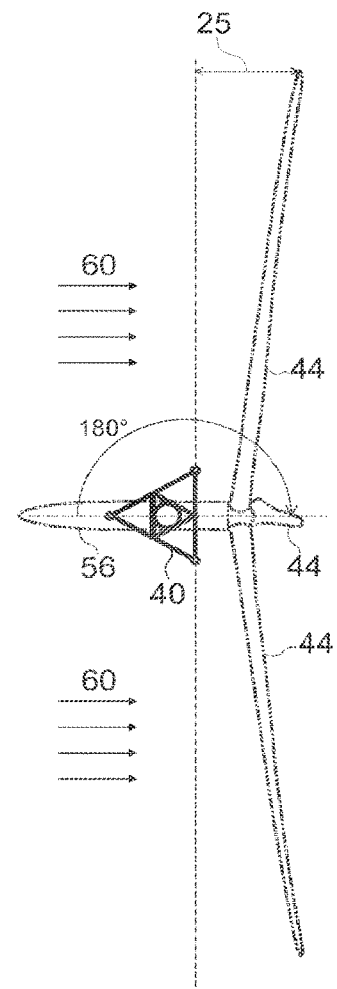
FIG. 18C is a top view of one exemplary of one embodiment of this invention wherein the load is a upwind turbine assembly with elongated nacelle, rotated by 180° with respect to the configuration of FIG. 18A.
Figure 22:
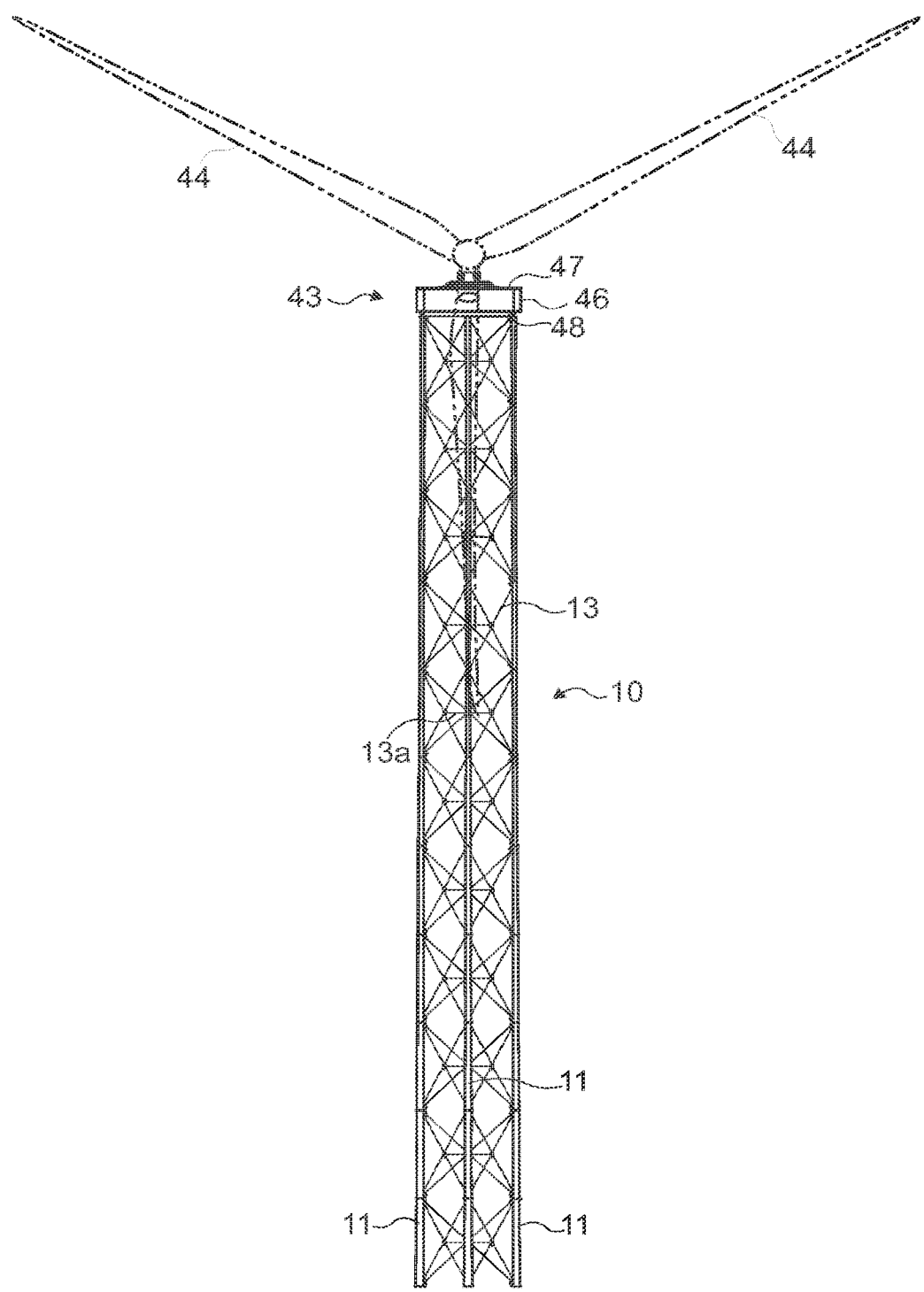
FIG. 22 is a frontal view of another exemplary of a support platform represented as a yaw support structure according to one embodiment of this invention.

In the case of the upwind design, as shown in FIG. 15A, as the tower is much stronger than conventional towers, it is possible to increase the clearance upwind distance 24 reducing the chance of a rotor blade striking the tower.

The design of the lattice tower 10 is made to support dynamic loads on the support platform 14 at the top portion of the tower 17a that cause reaction forces and moments in a base portion 17b of the lattice tower 10, that be above than 10 (ten) times greater that reaction forces and moments caused by wind loads on the lattice tower itself.

For reference and as an example of a load, a large scale wind turbine available commercially with nominal output of 7.58 MW has an approximate weight of the foundation of the turbine tower about 2,500 ton, the tower itself 2,800 ton, the machine housing 128 ton, the generator 220 ton, and the rotor (including the blade) 364 ton. Accordingly, the dynamics loads on the support platform caused by the generator and the rotor are much higher than maximum wind loads imposed specifically in the tower itself. Usually, a tower for supporting only standard telecommunication antennas would be subject to completely different loads, because in this case the wind loads in the tower are usually higher than the loads caused by the telecommunication antennas in the top of the tower.

The metallic legs 11 are designed in truncated conical portions in the first portion 21a and in the second portion 23a, and in cylindrical portion in the second portion 22a so that the diameter variation remains smooth throughout the metallic legs 11 length avoiding discontinuities that can cause areas of stress concentration which can also cause air bubbles during concreting, in case of adopting combinations of different materials in the metallic legs 11 construction.

Additionally, the conicity of the column axle envelope of the lattice tower 10 is preferably constant and can also be adjusted in order to compensate the variable conicity of the metallic legs 11, resulting in bracing members 13 that are identical, with the same length, diameter and thickness over the entire height of the lattice tower 10. This possibility allows standardizing the length of such bracing members, reducing the cost of their production and facilitating the assembly at site once, among others advantages, it will not be need to numbering them.

FIG. 5A is a side view of one exemplary of a lattice tower 10 according to one embodiment of this invention, serving as reference for showing in a schematic way the different configurations of the cross-sections of the tower legs along its height H. In the exemplary embodiment the outside diameter "D" to thickness "t" and ratio (D/t) of each metallic leg 11 is greater than 30.

FIGS. 5B, 5D and 5F are views of cross-section of the legs along the portions length of the lattice tower 10, said cross-sections are closed sections, according to one embodiment of this invention.

As shown in FIGS. 5B and 5C, schematically adapted, preferentially one of the third legs 23b has also a frusto-conical cross-section 31a and a top portion 31b at least one third leg 23b has a larger diameter than the bottom portion 31c of the at least one third leg 23b.

The second portion 22a is formed by second legs 22b having a cylindrical structure, as depicted schematically in FIGS. 5D and 5E. Thus, the diameter of each respective third leg 23b of the third portion 23a is larger than the diameter of each respective second leg 22b in the second portion 22a.

Additionally, as shown schematically in the FIGS. 5F and 5G preferentially at least one of the first legs 21b has a frusto-conical cross-section 30a and a bottom portion 30b of the at least one first leg 21b has a larger diameter than a top portion 31b of the at least one first leg 21b.

Preferentially, the metallic legs 11 have a circular closed cross-section as shown in the FIGS. 5B, 5D and 5F. Alternatively, the metallic legs 11 can also be designed in a shape having, for example, a polygonal cross-sectional shape provided that an aerodynamic fairing, provided that the frusto-conical shape is kept, as depicted in FIG. 6A.

Figure 6A:
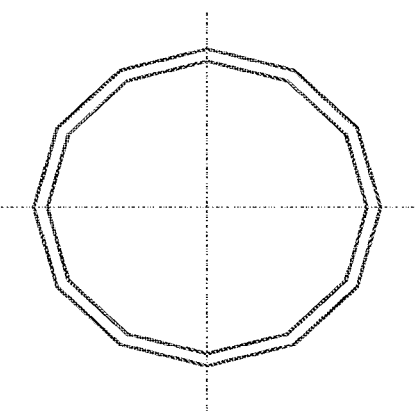
FIG. 6A is a view of one exemplary polygonal cross-sectional shape according to one embodiment of this invention.

The polygonal cross-sectional shape is shown in FIG. 6A as being, preferentially at least a dodecagon, but it is understood that it could be formed into other polygonal shapes, such as a tridecagon, tetradecagon, and so on, according to the suitable construction.

Figure 6B:
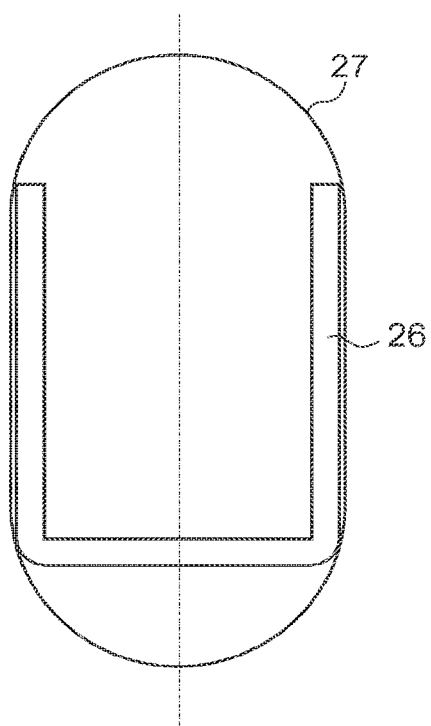
FIG. 6B is a view of one exemplary reduced web profile cross-sectional shape and fairing according to one embodiment of this invention.

The FIG. 6B illustrates another example of cross-sectional shape embodiments, preferably used as a profile for the bracing members 13 and auxiliary bracing members 13a, wherein a channel section with reduced web 26 is covered by a fairing with an oblong aerodynamic profile 27. The function of the fairing is to cover the channel section, so that the said section profile remains closed, enhancing the aerodynamic behavior of the metallic section with a low cost material of easy formation, such as polymers, composite materials or other materials, as depicted in FIG. 6B. The fairing is intended to minimize turbulence caused by the wind and can be designed, alternatively, as example, into another aerodynamic suitable shapes, which may also include dimples or waves (not shown in the FIG. 6B) on the surface to generate tiny eddy currents over which air can flow smoothly, reducing turbulence and improving aerodynamic performance.

Beyond the metallic material applied for the construction of said metallic legs 11, for instance steel, they can also be constructed with metallic materials associated with composite materials, or composite material with reinforced concrete, or composite material with pre-stressed concrete, or combinations thereof; for example, the metallic legs 11 can be filled with reinforced concrete for reinforcement of the structure. As the vertical structures for the preferred applications, such as wind energy generators, are usually very high, for instance higher than 60 meters, each metallic leg 11 will usually be fabricated in separated segments that are joined together during installation on the site. This means a combination of materials along the length of the lattice tower 10 like, for example and not limited to: the first portion 21a manufactured together with pre-stressed concrete, the second portion 22a manufactured together with concrete material with reinforced concrete and the third portion 23a manufactured together with composite materials, or other suitable materials combinations.

Figure 7:
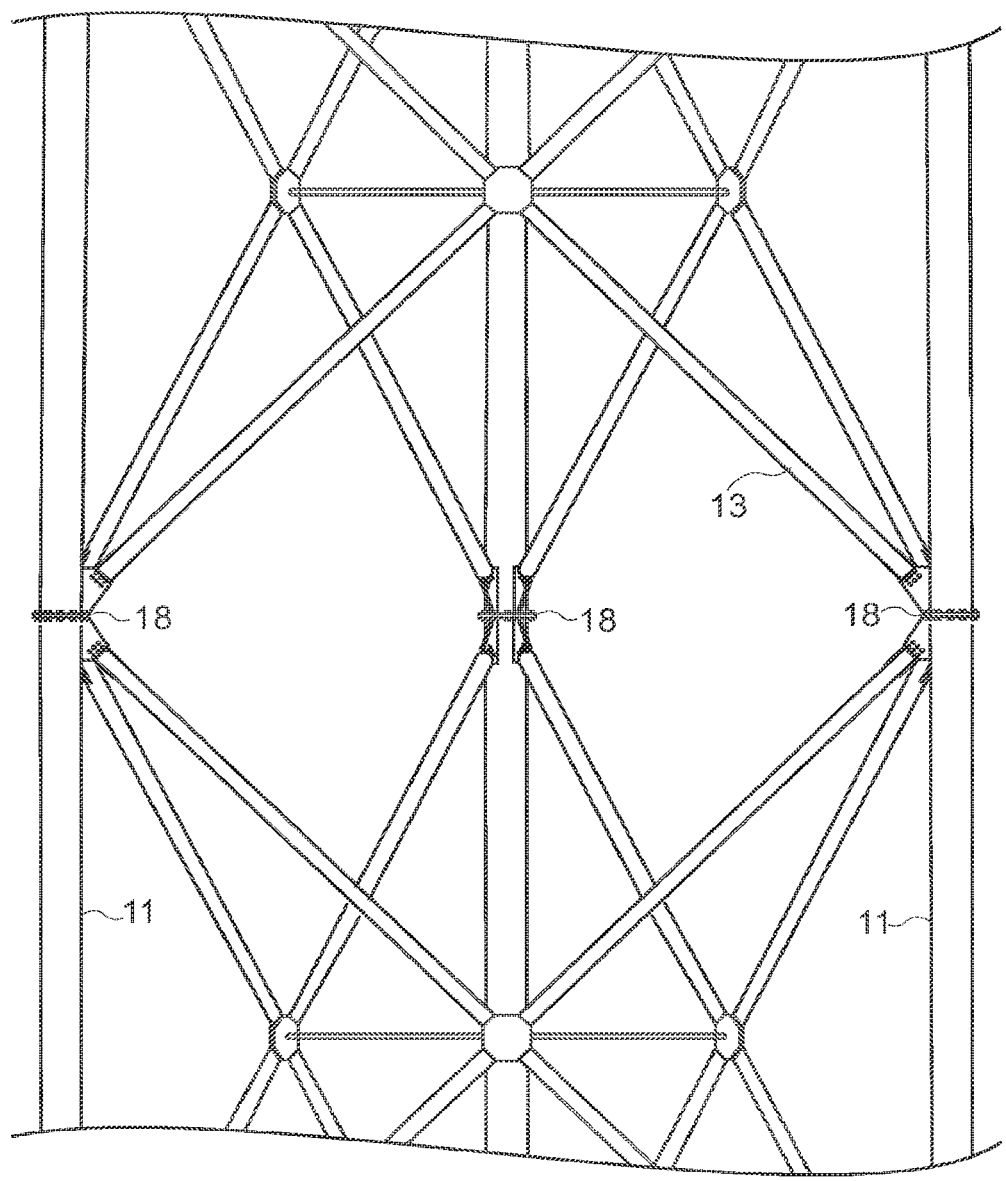
FIG. 7 is a detailed view of one exemplary connection of the modules of the lattice tower length, according to one embodiment of this invention.
Figure 8:
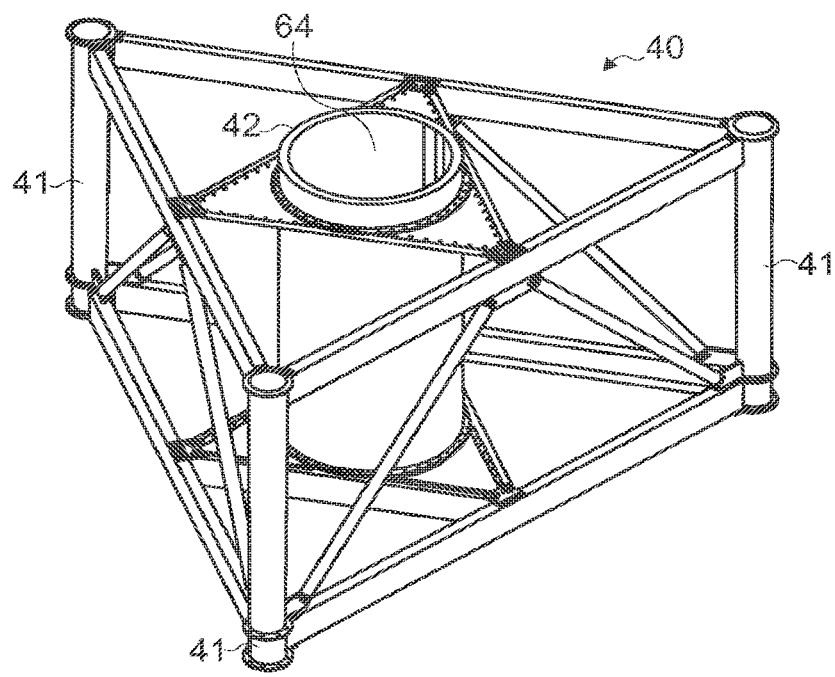
FIG. 8 is perspective view of the support platform with inner tubular interface to perform similar function as the current technique for elongated nacelles, according to one embodiment of this invention.
Figure 9:
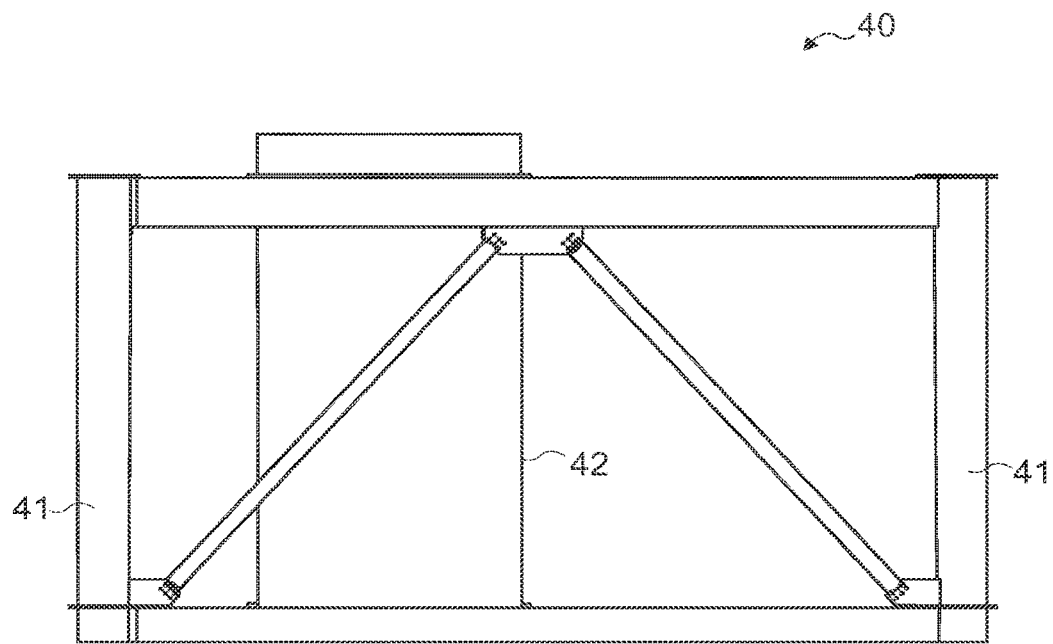
FIG. 9 is a lateral view of the support platform with inner tubular interface, according to one embodiment of this invention.
Figure 10:
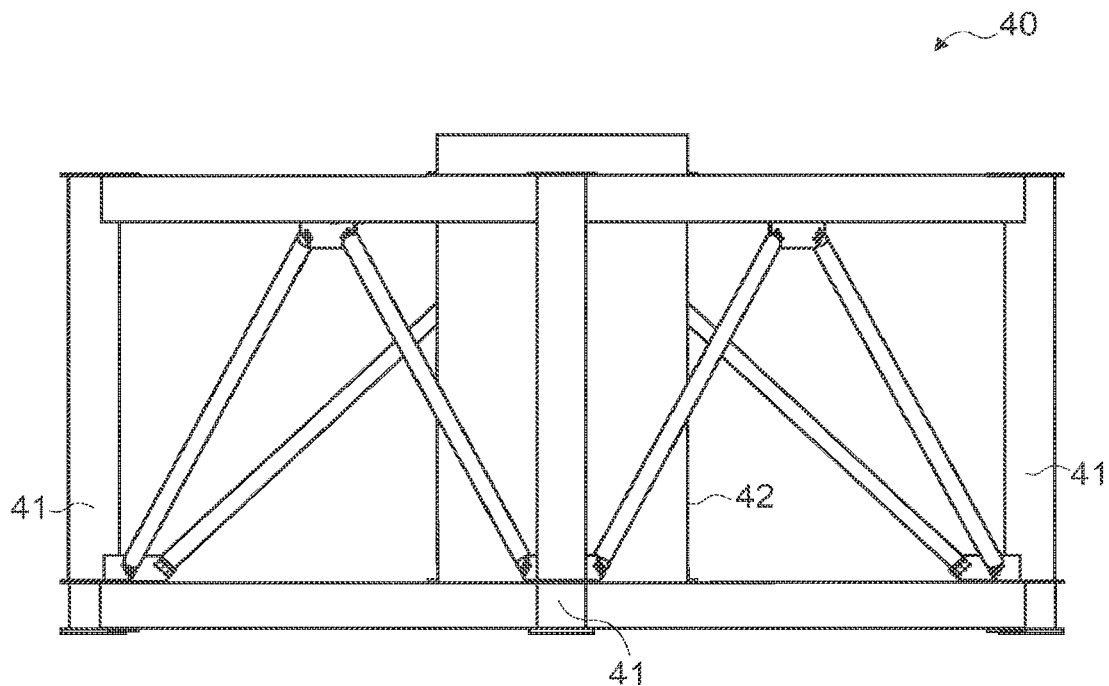
FIG. 10 is a frontal view of the support platform with inner tubular interface, according to one embodiment of this invention.
Figure 11:
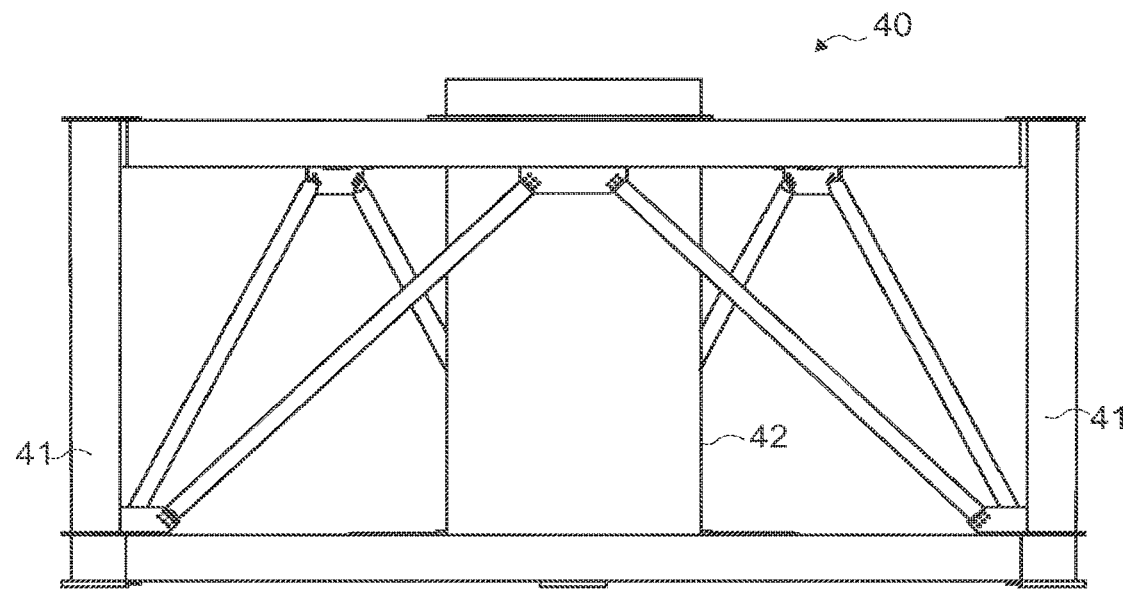
FIG. 11 is a posterior view of the support platform with inner tubular interface, according to one embodiment of this invention.
Figure 12:
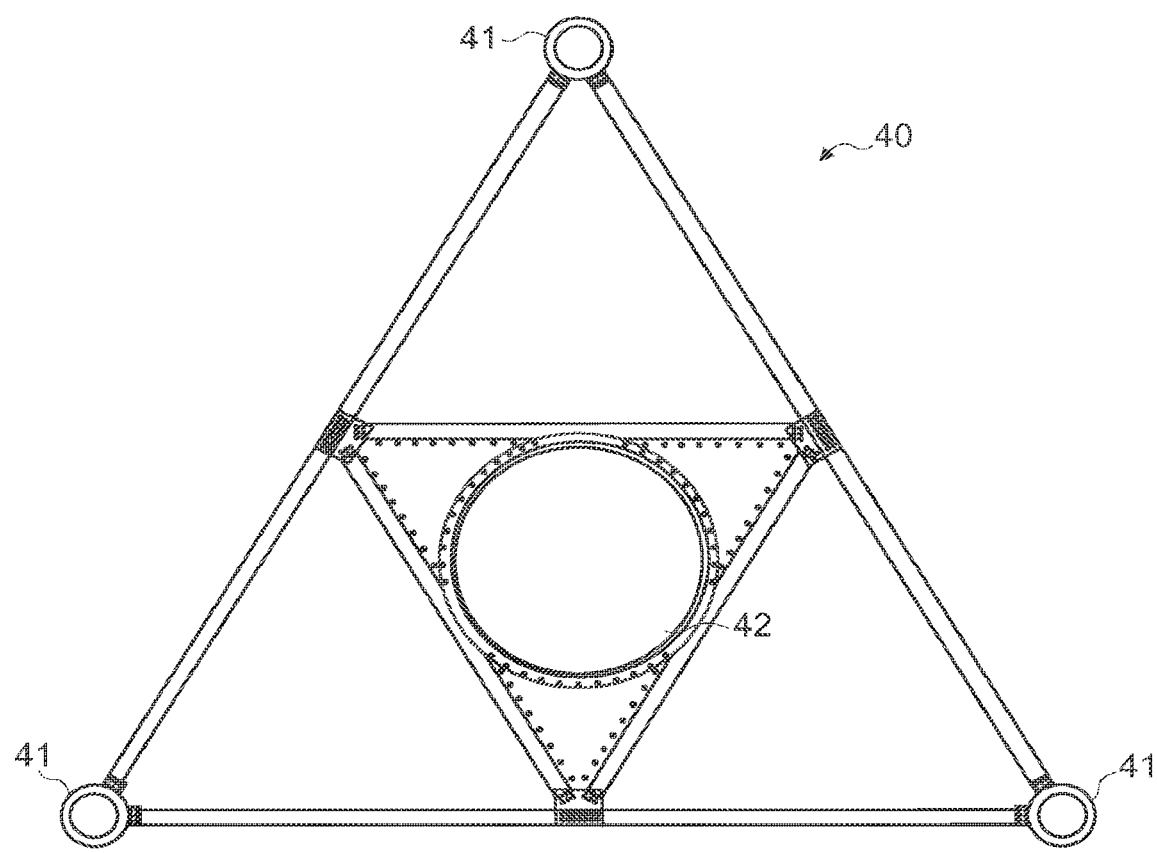
FIG. 12 is a plan view of the support platform with an inner tubular interface for passageway for cables according to one embodiment of this invention.

As example of one embodiment of this invention, the coupling between portions 21a, 22a and 23a as well as between modules 20 of every respective portion is done by using flange 18 coupling, as depicted in FIG. 7.

The bracing members 13 and the auxiliary bracing members 13a are preferentially cylindrical shaped, or channel sections (U) with an oblong fairing, and with substantially similar or equal length along the entire height of the lattice tower 10, because with the largest amount of equal parts reduces manufacturing costs and facilitates assembly.

Although the skilled in the art usually adopt for the bracing diagonal members and horizontal bars the standard sections commonly used for the purpose of constructing lattice towers, they can be advantageously substituted by bracing members 13 and auxiliary bracing members 13a having at least one channel section wherein the length of the channel web is smaller than the length of the channel legs as the ones describes in the WO 2010/076606A1, which specification is incorporated herein by reference.

Accordingly the bracing members 13 or auxiliary bracing members 13a can be constructed with a closed cross section, or by using a composite material, or by using a metallic bracing member reinforced with a composite material, or metallic bracing member with closed cross section filled with concrete, or other suitable combinations thereof.

The exemplary embodiment shown in FIGS. 8 to 12 illustrate how the load, in the case of a wind energy turbine, can be supported atop the said lattice tower 10 through a support platform with an inner tubular interface 40 that is, in turn, coupled to the lattice tower structure 10 by each platform leg 41 with each respective third leg 23b of the third portion 23a.

The support platform with inner tubular interface 40 is formed by three platform legs 41, each platform leg coupled to a respective third leg 23b of the third portion 23a and an inner tubular interface 42 coupled to the three platform legs 41, as depicted in FIGS. 8 to 12. In the case of supporting a wind turbine, the inner tubular interface is formed by a steel tube and is fixed on the support to allow connection with the nacelle, using the state of the art in terms of nacelle fixation.

Figure 13A:
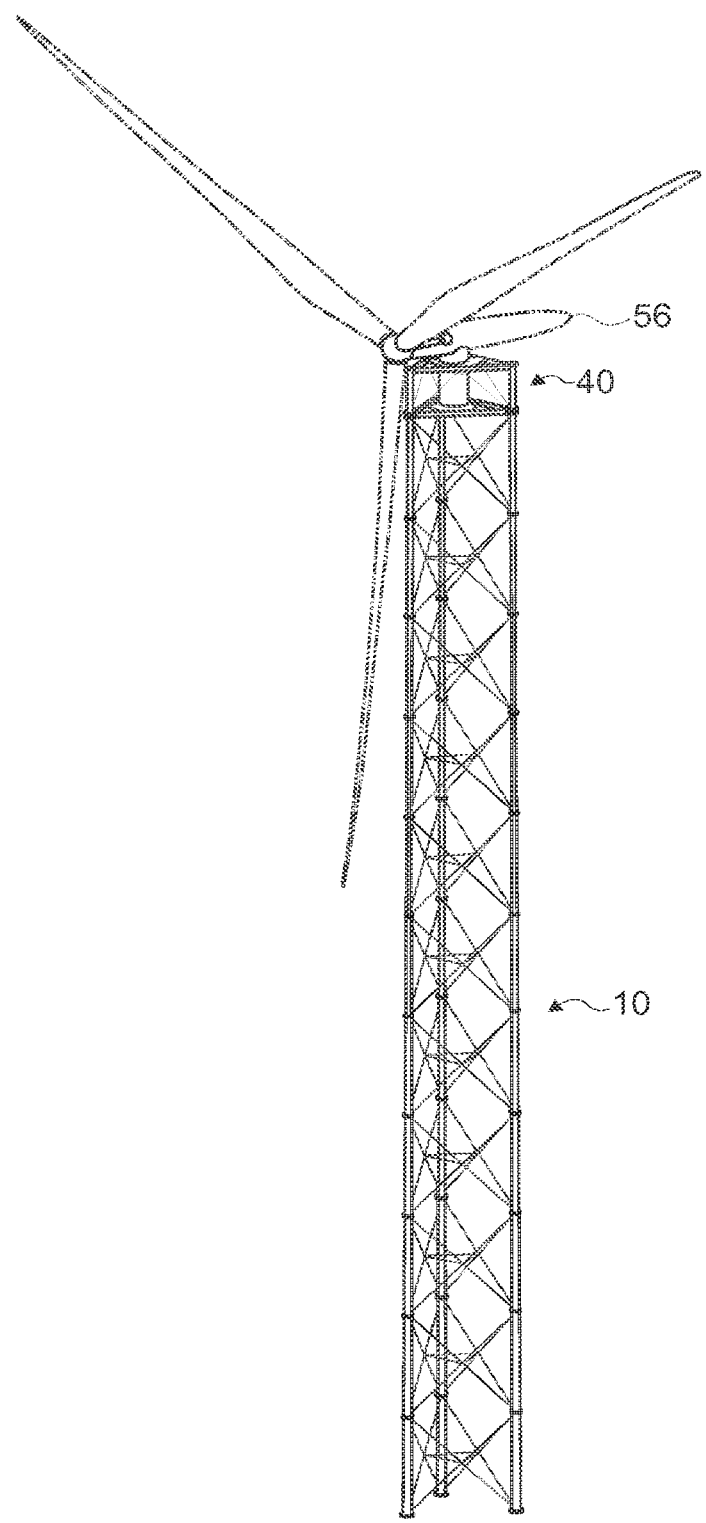
FIG. 13A is a perspective view of one exemplary of a lattice tower with support platform with inner tubular interface related to a wind energy turbine, according to one embodiment of this invention.
Figure 13B:
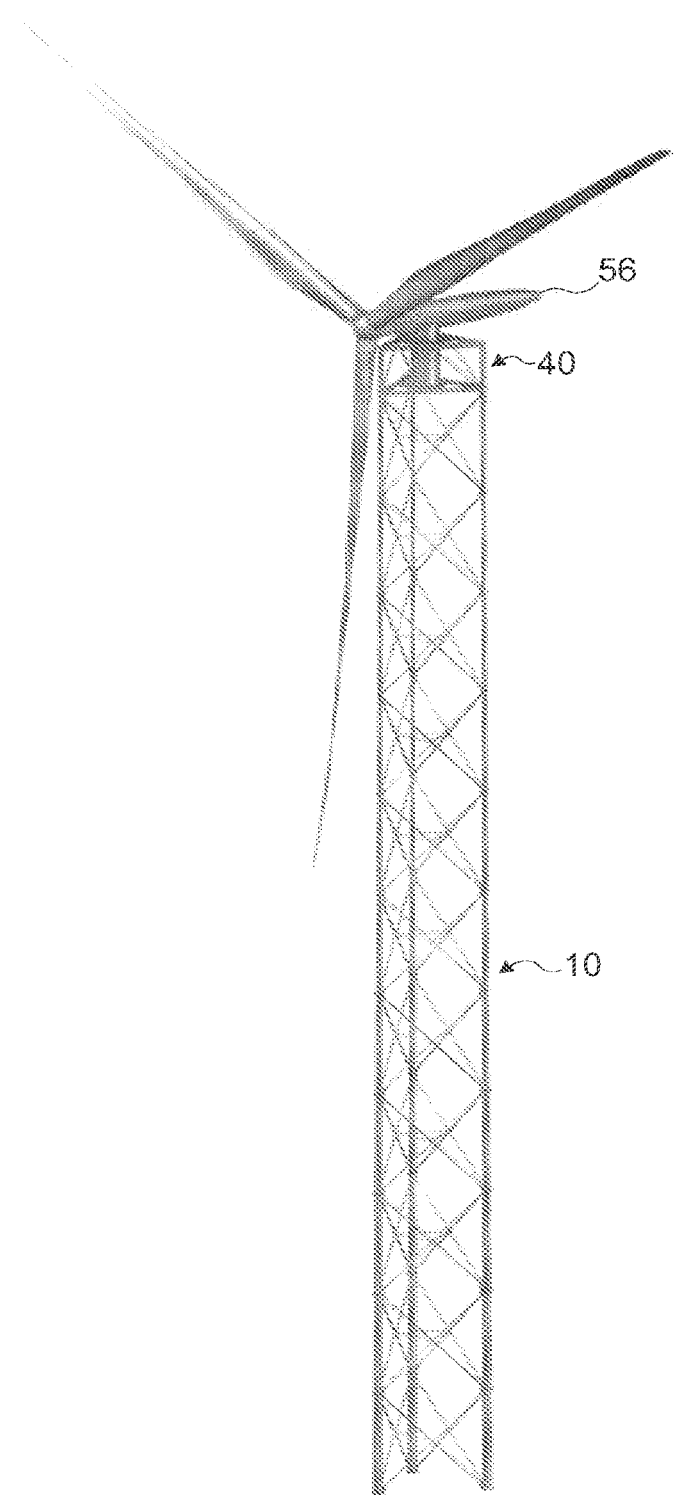
FIG. 13B is also a perspective view of the solid model of one exemplary of a lattice tower with support platform with inner tubular interface related to a wind energy turbine, according to one embodiment of this invention.
Figure 14:
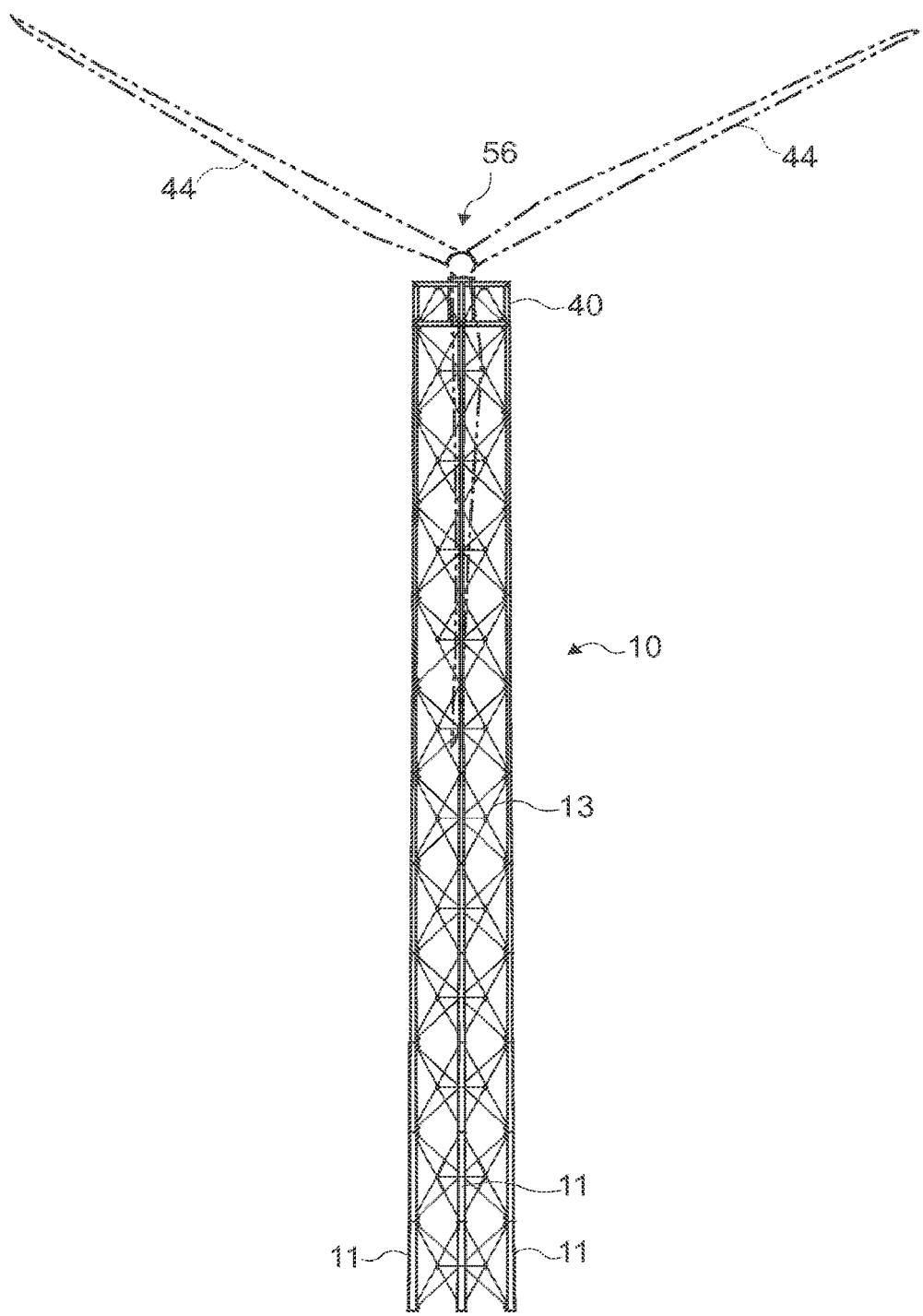
FIG. 14 is a frontal view of one exemplary of a lattice tower with support platform with inner tubular interface related to a wind energy turbine, according to one embodiment of this invention.

In the exemplary embodiment shown in FIGS. 13A and 13B, a wind energy turbine with elongated nacelle 56 is coupled to the lattice tower 10, at its top. Thus, as the lattice tower gives less wind shade than a tubular steel tower (monopole), the said lattice tower can be arranged to an upwind or downwind design, in accordance with the wind direction 60 and depending upon the suitable application or construction, as depicted respectively in FIGS. 14 to 18B.

For illustrative and exemplificative purposes, not limiting the present invention, the FIGS. 19A and 19B show the Table I which is a dimensioning spreadsheet of an exemplary embodiment of the lattice tower 10 with 138 meters high (about 453 ft), using only metallic legs and bracing members without a composite material reinforcement. The dimensioning spreadsheet shows up the essential dimensions of the structure of the exemplary lattice tower 10 starting from the quantity of modules 20 as well as their height wherein the modules 20 are connected together form the lattice tower 10 high.

FIGS. 20A and 20B show the Table II which is also a dimensioning spreadsheet of an exemplary embodiment of the lattice tower 10 which is 138 meters high (about 453 ft), wherein the legs and bracing members include reinforced concrete.

In the embodiments of described in the Tables I and II in the FIGS. 19A, 19B, 20A and 20B the central longitudinal axes 16 of the metallic legs 11 are inclined with less than 0.35 degrees in relation to the vertical axis of the tower 12. The metallic legs 11 have variable conicity, wherein their diameter starts with 1,000 mm (about 3.281 ft) at the base decreasing to 510 mm (about 1.673 ft) at 84 meters high (about 275.5 ft) (relating to the first portion 21a already shown in FIG. 2A); keeps up the diameter with 510 mm (about 1.673 ft) up to 120 meter high (about 393.6 ft) (relating to the cylindrical second portion 22a already shown in FIG. 2A). Thereafter the conicity of the metallic legs 11 has the same value as the first portion 21a, but in a reversed way, and the diameter of the metallic legs 11 increases to 598 mm (about 1.960 ft) at the top of lattice tower 10 in 138 meters high (about 452.6 ft).

The thicknesses of the legs modules 20 are those normally available in the market standards. The thickness of the bracing member 13 and the auxiliary bracing members 13a was calculated to withstand stresses on the base portion 17b of the lattice tower 10. The connections systems of the bracing members 13 and of auxiliary bracing members 13a with the metallic legs 11 of the lattice tower 10 as well as among themselves, are made of steel and weight about 9.7 tons.

In the exemplary embodiment shown in FIG. 13A, the lattice tower 10 has about 0.19 degrees of conicity to compensate the variable conicity of the metallic legs 11. The conicity of the lattice tower 10 is constant along its vertical axis 12, and the longitudinal central legs axis 16 is linear and concentric to the axle of the portions 21a, 22a and 23a, for not generating points of stress concentration.

Therefore, due to the shape of the lattice tower 10 as well as the structural performance and behavior it is obtained a surprising reduction in the total cost of the structure, beside the increase of frequency if comparing with a standard monopole tower, normally used for loading wind turbine, as depicted bellow in the Table III. Costs were estimated on a relative currency, covering the costs of materials, manufacturing, logistics and manpower, not considering the cost of special transportation required by components with large dimensions or weights. Metallic legs 11, bracing members 13 and auxiliary bracing members 13a may be fabricated by any suitable metallic material, for instance, steel. A high strength low-alloy structural steel is preferred, and for the comparison shown, the properties of the steel preferably used are the following: yield strength (fy) is about 3,806 kgf/cm$^2$; young's modulus (E) is about 2,100,000 kgf/cm$^2$ and density is about 7,850 kgf/m$^3$. Concrete used has about the following properties: strength (fck) is 510 kgf/cm$^2$; young's modulus (E) is 343,219 kgf/cm$^2$ and density is 2,300 kgf/m$^3$. The embedded steel bars of the reinforced concrete have about the following properties: yield strength (fy) is 5,000 kgf/cm$^2$; young's modulus (E) is 2,100,000 kgf/cm$^2$ and density is 7,850 kgf/m$^3$.

The FIG. 21 shows the Table III corresponding to the lattice tower 10 in steel only, taking as reference for the comparison and named here as TA1, for wind turbines installed in a high greater than 60 meters (about 196.8 ft), is lower cost, of simpler logistics and better spectrum of natural frequencies than a monopole, also in steel and named here as TM1, considering an equivalent resistance. The manufacturing cost of the lattice tower 10 is reduced to ⅓ of the cost of the monopole. Considering a lattice tower 10 wherein is used a combination of materials, like steel and reinforced concrete named here as TAC1, the cost is reduced to ⅕ of the monopole TM1, as also depicted in the Table III.

The frequency of the first mode increases from 0.151 Hz, for the monopole tower TM1, to 0.297 Hz, for the TA1. The frequency of 0.297 Hz is out of the frequency range of the rotor blades of a wind turbine. For the lattice tower TAC1 wherein is used a combination of materials in the legs and bracing members, the frequency rises to 0.381 Hz. It also shows that by changing steel by mixed materials of the same resistance, for example, reinforced concrete, the cost of the TAC1 decreases even more at the same time the frequency spectrum is improved. For TAC1, the frequency of the first mode increases to 0.381 Hz and the cost is reduced approximately 40% in relation to the cost of the TA1.

The Table III summarizes the comparison between the three technologies studied. The lattice tower TAC1 in steel and reinforced concrete has the following advantages:

1) Lower Cost: it costs about 20% of monopole TM1 and about 61% a lattice tower TA1 in steel only;
2) It has natural frequency of 0.387 Hz, about 28% higher than the lattice tower TA1 in steel and about 152% higher than the monopole TM1;
3) Transport is simpler and lower cost: The concrete is of lower cost transport and can be obtained easily nearby of the most sites of installations, thus the more expensive cost for transporting is for the steel. The tower TAC1 used 99.2 tons of steel, considering the steel used in the shells of the legs as well as for reinforcing the concrete and for the flanges. This value is 59% of a TA1 tower which has 167.0 tons and is 25% the mass of the monopole tower TM1, with 402.5 tons. For the monopole tower TM1 the cost is even higher, because it is necessary special transporting system for tubes of 4 meters diameter (13.123 ft) with 12 or 24 meters of length (about 39.4 or 78.7 ft of length).

The lattice tower also presents an equivalent diameter from 1.6 to 1.8 meters (about 5.245 to 5.905 ft) with indices of exposed area ranging from 13.5% to 15.5%, in the tower height achieved by the length of the rotor blades. As also the metallic legs 11 of the tower are distributed along a distance of 12 meters (about 39.4 ft) between their central longitudinal axes 16, the turbulence caused by the tower is small, which allows its use also to downwind configurations. This setting is more critical in the tower like monopoles in steel or concrete.

The use of rotor downwind brings numerous advantages to the turbine. In this condition the drag and centrifugal force helps reduce the moment at the blade root by approximately 50%, thereby reducing by 50% the weight of the blades and the hub. Thus it is less weight to be balanced in the nacelle. By having a lower moment of inertia, the azimuth control system is lighter and lower cost. These and other advantages lead to reduced final weight atop the tower in 30 to 40%. Less weight on top implies higher natural frequencies, further improving the performance of tower in steel and reinforced concrete. Consequently, by these surprising effects, a significantly more economical tower is obtained, as it is summarized in the TABLE III, as depicted in FIG. 21.

Further, in another exemplary embodiment as shown from FIGS. 23 to 31, the support platform with inner tubular interface 40 is alternatively substituted or complemented with a yaw mechanism support structure 43 which is also provided to support a wind energy turbine with elongated nacelle 56, which have a plurality of rotor blades 44 operatively coupled to gearbox 63 and the electric generator 45 by a shaft 65.

The yaw mechanism support structure 43 is formed by a body 46, an upper surface 47, a lower surface 48 and a preferentially circular track 49, defined, also preferentially, close to the perimeter of the upper surface 47 of the yaw mechanism support structure 43.

Figure 23:
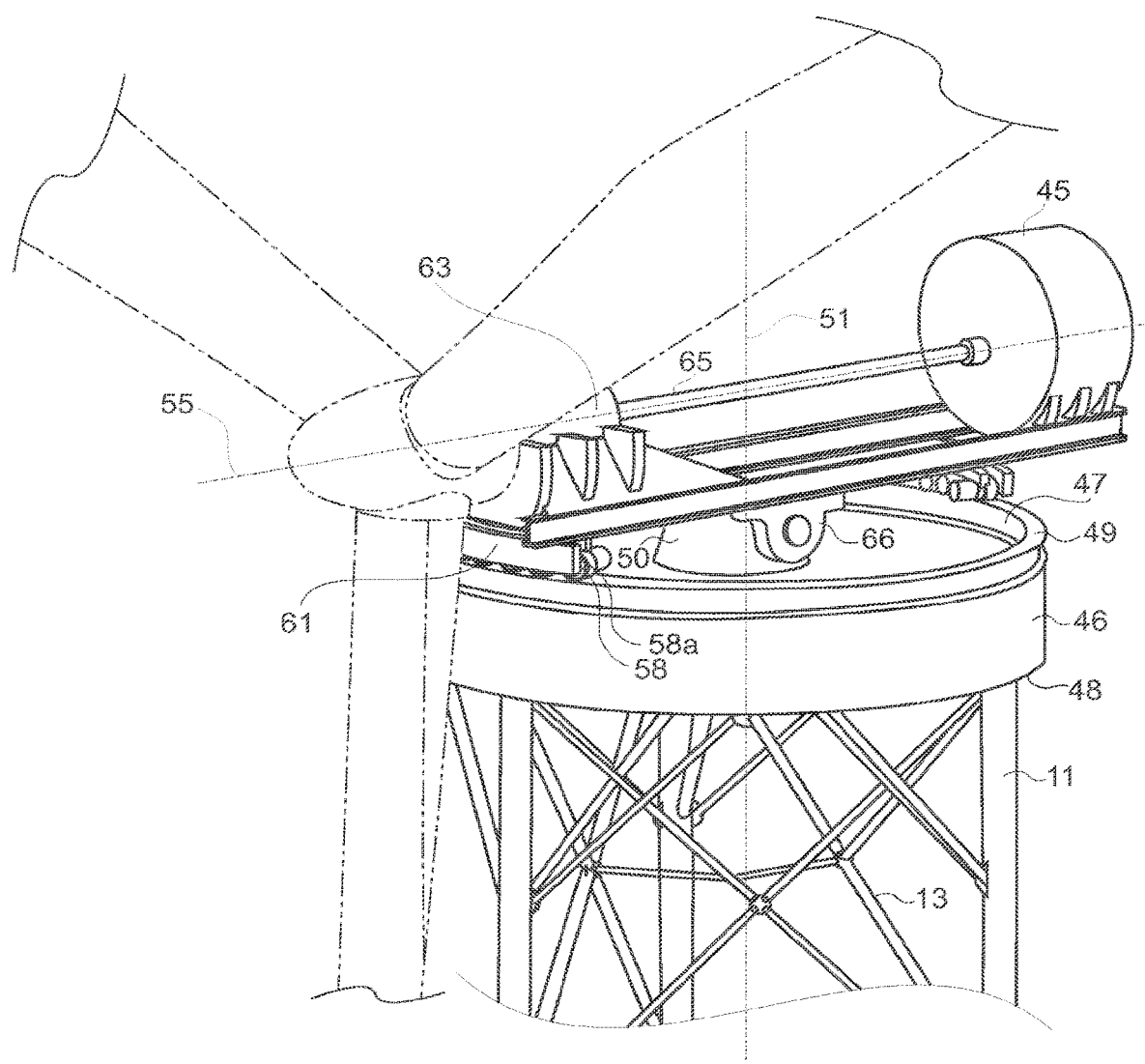
FIG. 23 is a perspective view of another exemplary of a support platform represented as a yaw support structure according to one embodiment of this invention.

Additionally, as depicted in FIG. 23, a yaw rotating mechanism 50 is coupled to the support platform at a position, preferentially centered within the circular track 49 and extending above the upper surface 47 of the support platform. Thus, the yaw rotating mechanism 50 is configured to rotate about a first axis 51 that is, preferentially, perpendicular to the upper surface of the support platform. Further, the yaw rotation mechanism 50 is coupled to longeron of turbine support platform 52 by mean of a furling mechanism 66. In addition, a passageway for cables 64 (shown in FIG. 24), for example, power cable, is defined in the yaw rotating mechanism 50. By keeping cables internal to the axis of yaw rotating mechanism 50 is avoided to get the cables pinched in other parts of the mechanism, thereby avoiding wear on the cables.

Figure 24:
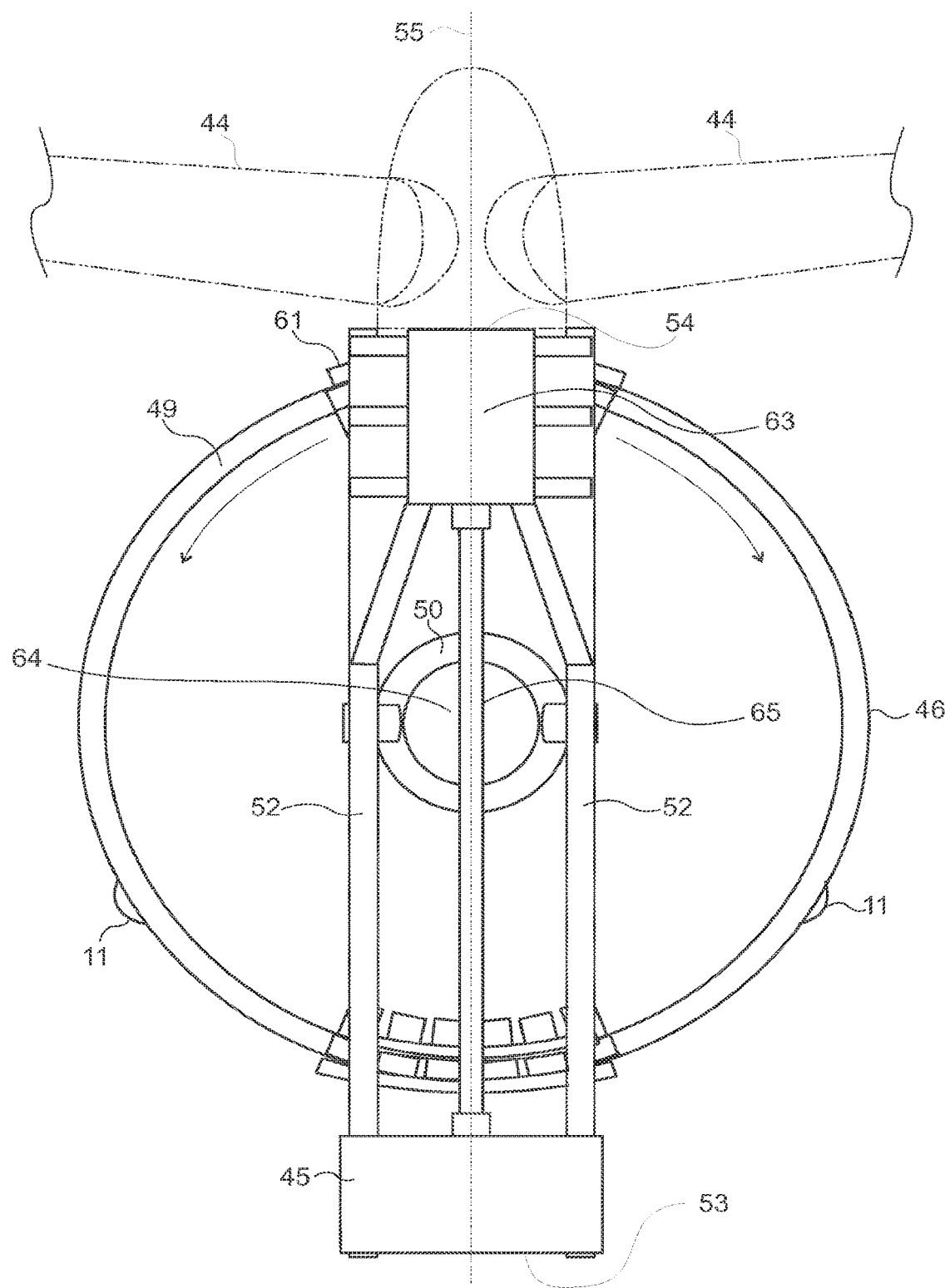
FIG. 24 is a plan view of another exemplary of a support platform represented as a yaw support structure according to one embodiment of this invention.

FIG. 24 shows the longeron of turbine support platform 52 having a first end 53 and a second end 54 spaced apart from the first end by a distance of at least one radius of the circular track 49, the longeron of turbine support platform 52 being pivotally coupled to the yaw rotating mechanism 50 to allow the longeron of turbine support platform 52 to pivot about a first axis 51 that is substantially perpendicular to the second axis 55 and substantially parallel to the upper surface 47 of the support platform, the longeron of turbine support platform 52 being configured to support at least the weight of the plurality of rotor blades 44 and the electric generator 45 of the wind energy turbine with elongated nacelle 56 mounted thereto.

Figure 25:
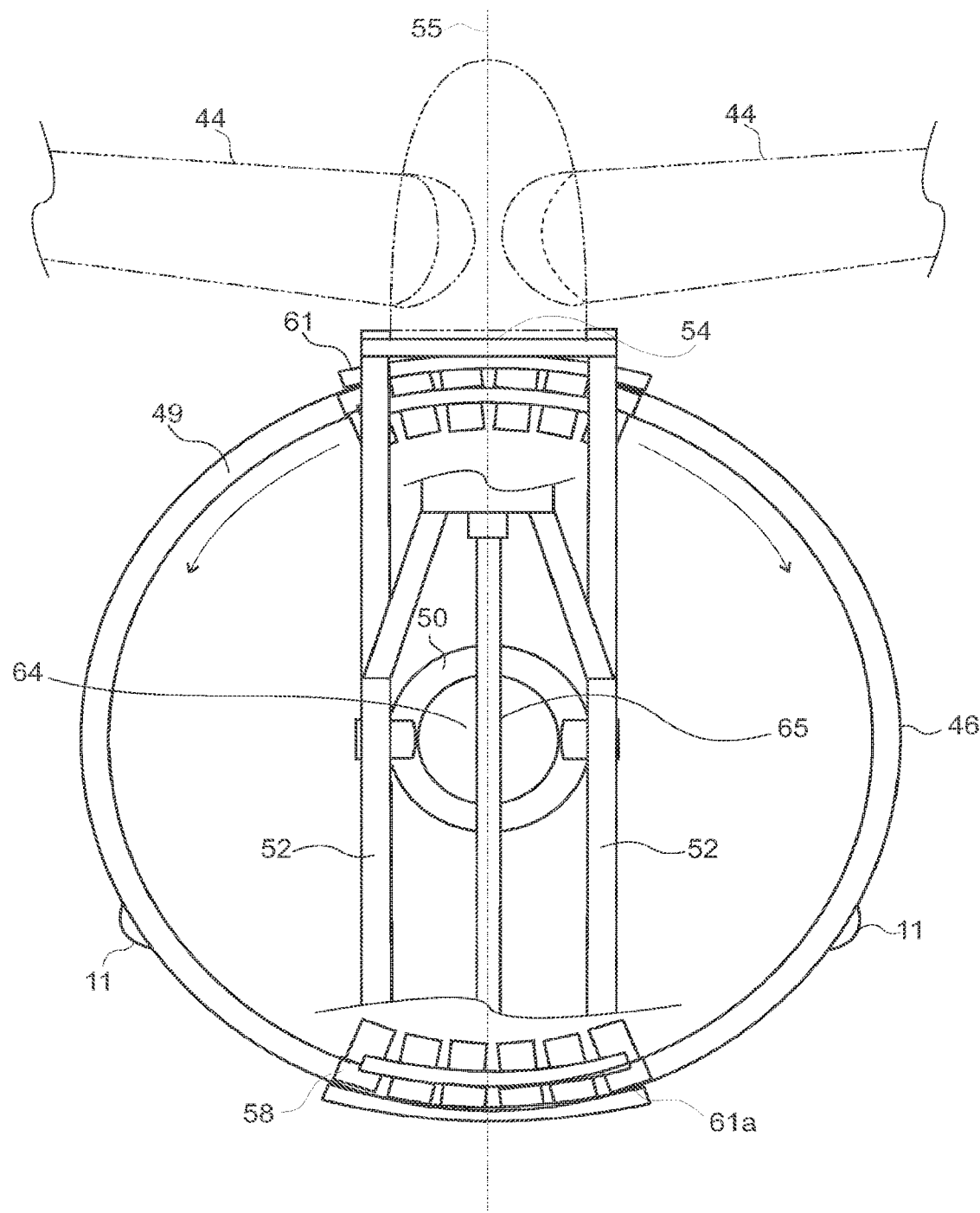
FIG. 25 is a detailed superior view of another exemplary of a support platform represented as a yaw support structure according to one embodiment of this invention.
Figure 26:
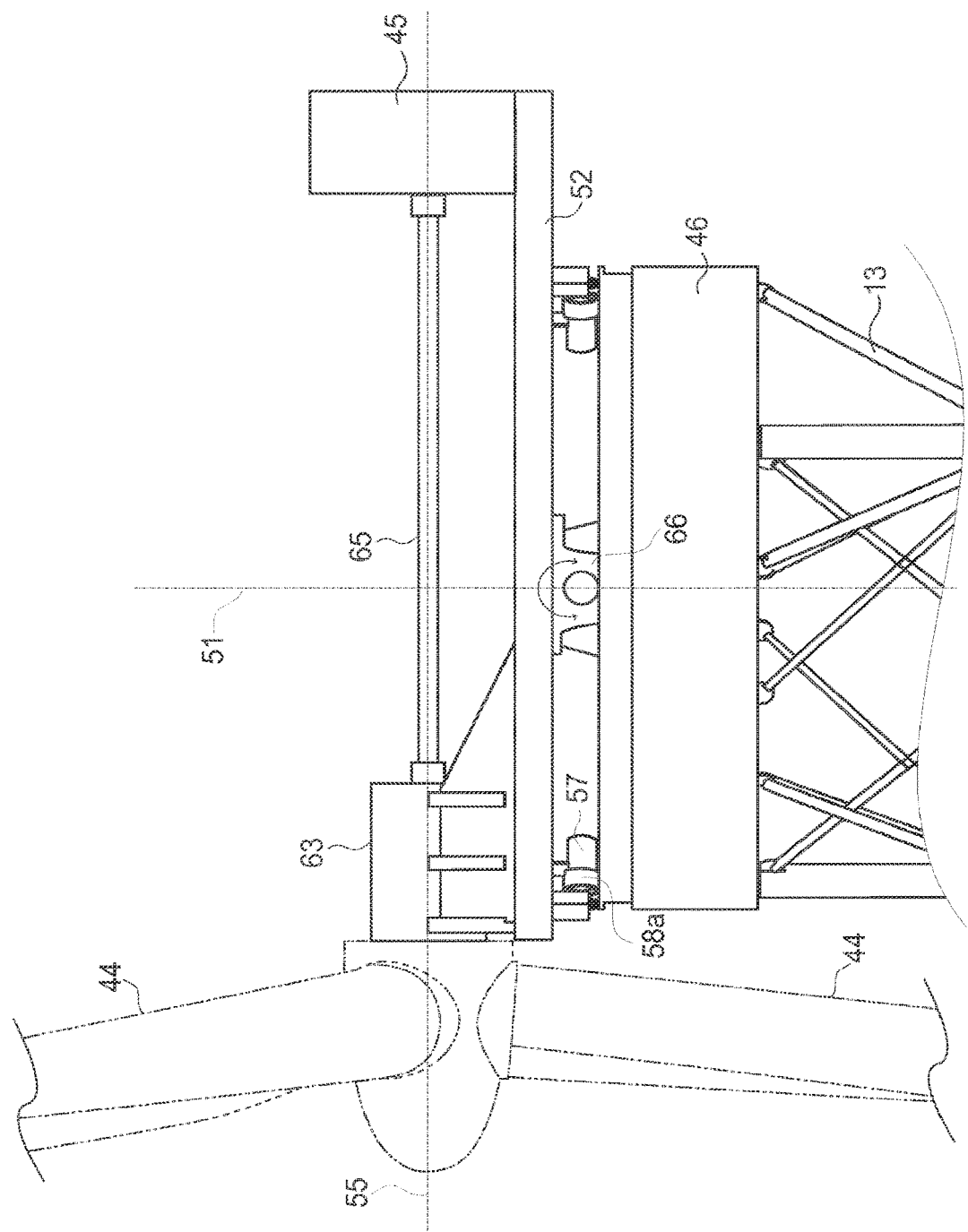
FIG. 26 is a lateral view of another exemplary of a support platform represented as a yaw support structure according to one embodiment of this invention.
Figure 27:
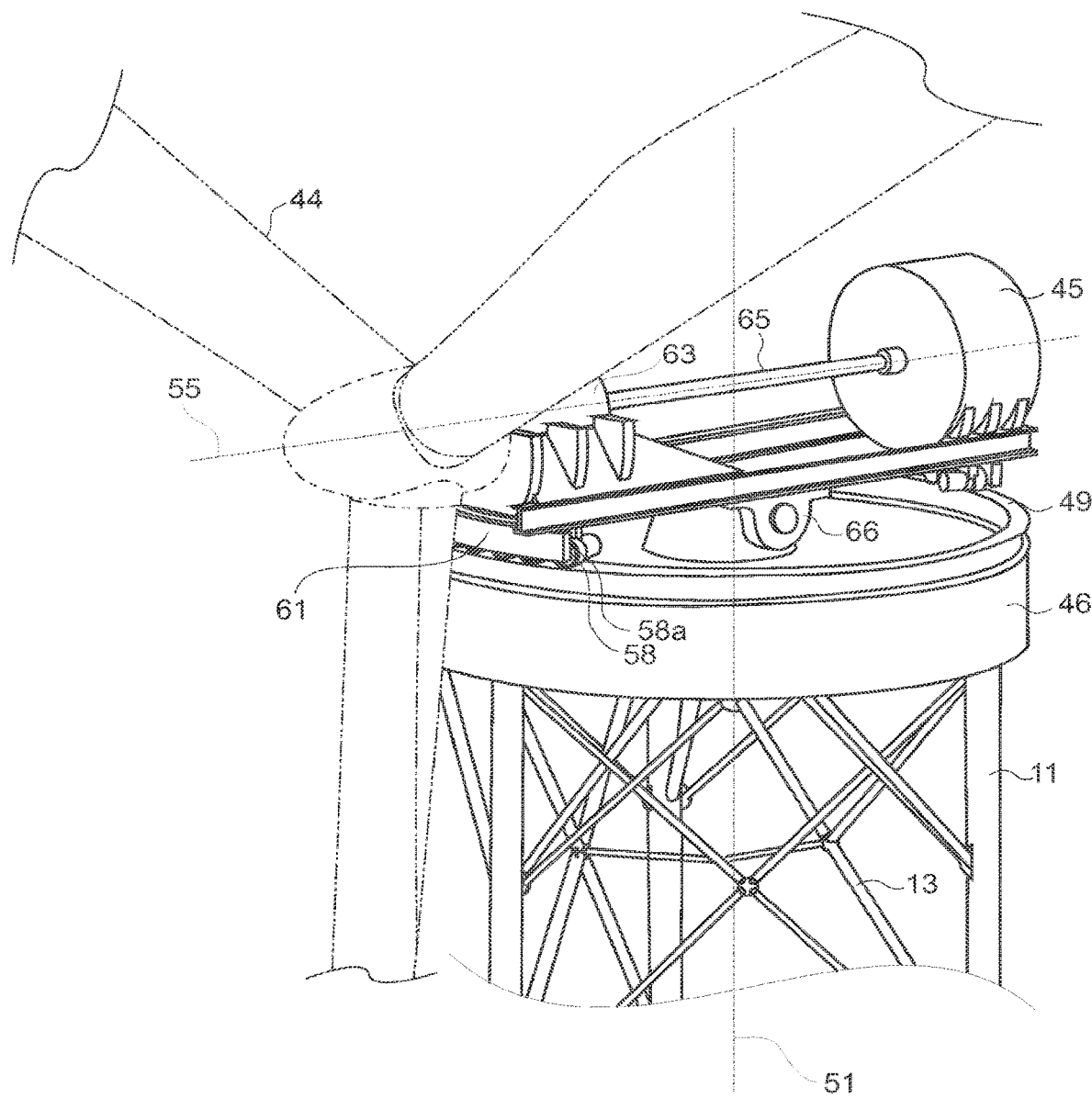
FIG. 27 is a perspective view of another exemplary of a support platform represented as a yaw support structure with two interfaces according to one embodiment of this invention.
Figure 28:
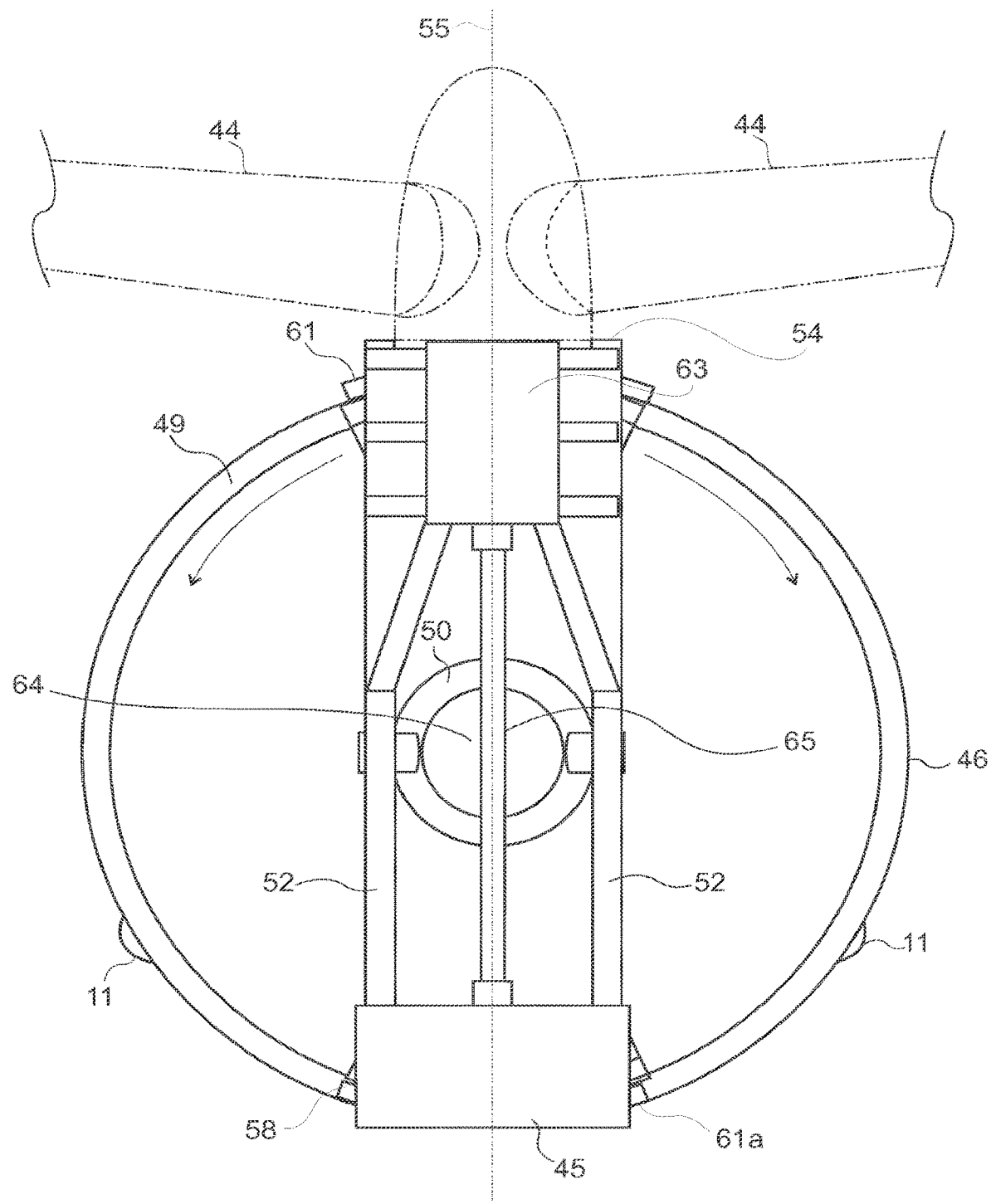
FIG. 28 is a plan view of another exemplary of a support platform represented as a yaw support structure with two interfaces according to one embodiment of this invention.
Figure 29:
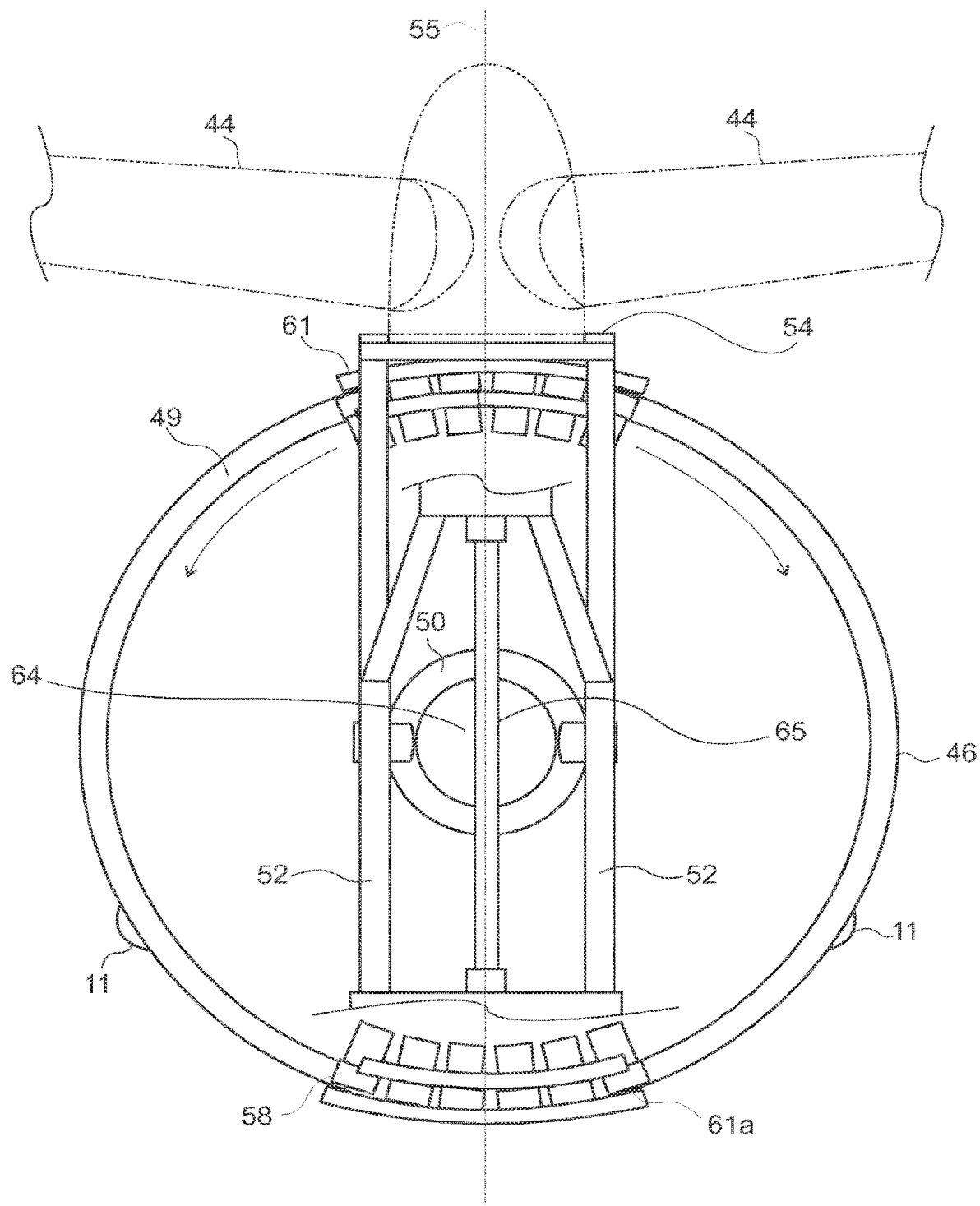
FIG. 29 is a plan view of another exemplary of a support platform represented as a yaw support structure with two interfaces according to one embodiment of this invention.
Figure 30:
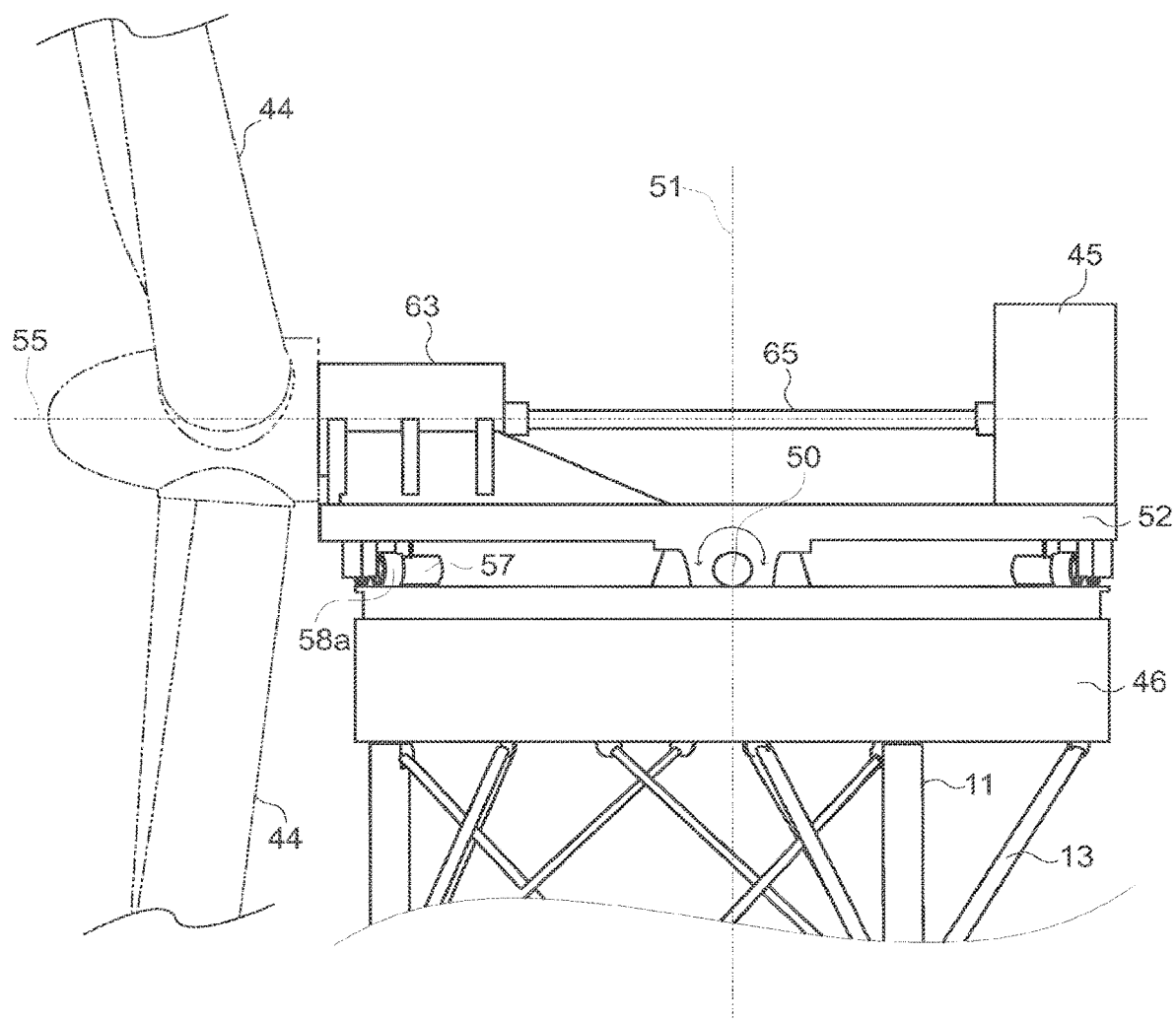
FIG. 30 is a lateral view of another exemplary of a support platform represented as a yaw support structure with two interfaces according to one embodiment of this invention.

FIGS. 24 to 26 show the interface 61 disposed proximate the second end 54 of the longeron of turbine support platform 52 and between the longeron of turbine support platform 52 and the substantially circular track 49, the interface 61 being configured to provide for the second end 54 of the longeron of turbine support platform 52 to move along the substantially circular track 49 to provide adequate yaw to the wind direction 60. Additionally, the interface 61 is provided with a yaw actuator 57 wherein a yaw locking mechanism (not shown) is incorporated.

The interface 61 is represented by at least two wheels 58, preferentially six to transfer turbine loads to the track 49 while the wind turbine is pivoting around the yaw rotating mechanism 50, according to one embodiment of this invention. Alternatively, the interface 61 may be provided with, for example, a pinion gear and a toothed track. Additionally, the wheels 58 are covered by a dampener element 58a provided for absorption of vibration which may be caused the wind 60. The dampener element 58a, incorporated into the wheels 58 of the said interface 61, is, for example, based on an elastomeric material.

A second interface 61a is provided at the first end 53 of the turbine support platform frame 52. The second interface 61a has the same function and elements of the interface 61 and is symmetrically positioned in relation to the yaw mechanism rotating support 50 to ensure suitable loading distribution of the wind energy turbine elements along the platform as well as to reduce furling rotation which may be caused by the wind force.

This design allows ensuring the wind energy turbine 56 with elongated nacelle is producing the maximal amount of electric energy at all times, by keeping the rotor blades 44 in an optimal positioning into the wind as the wind direction changes. Further, the yaw mechanism support structure 43 provides better weight distribution of the load along its second axis 55, thus reducing an asymmetric load along the structure of the yaw mechanism support structure 43 and the lattice tower 10 which may be caused by the multidirectional flowing of wind.

FIGS. 27 to 31 illustrate another exemplary embodiment wherein the shaft 65 is shorter than the exemplary embodiment shown in FIGS. 22 to 26.

Figure 31:
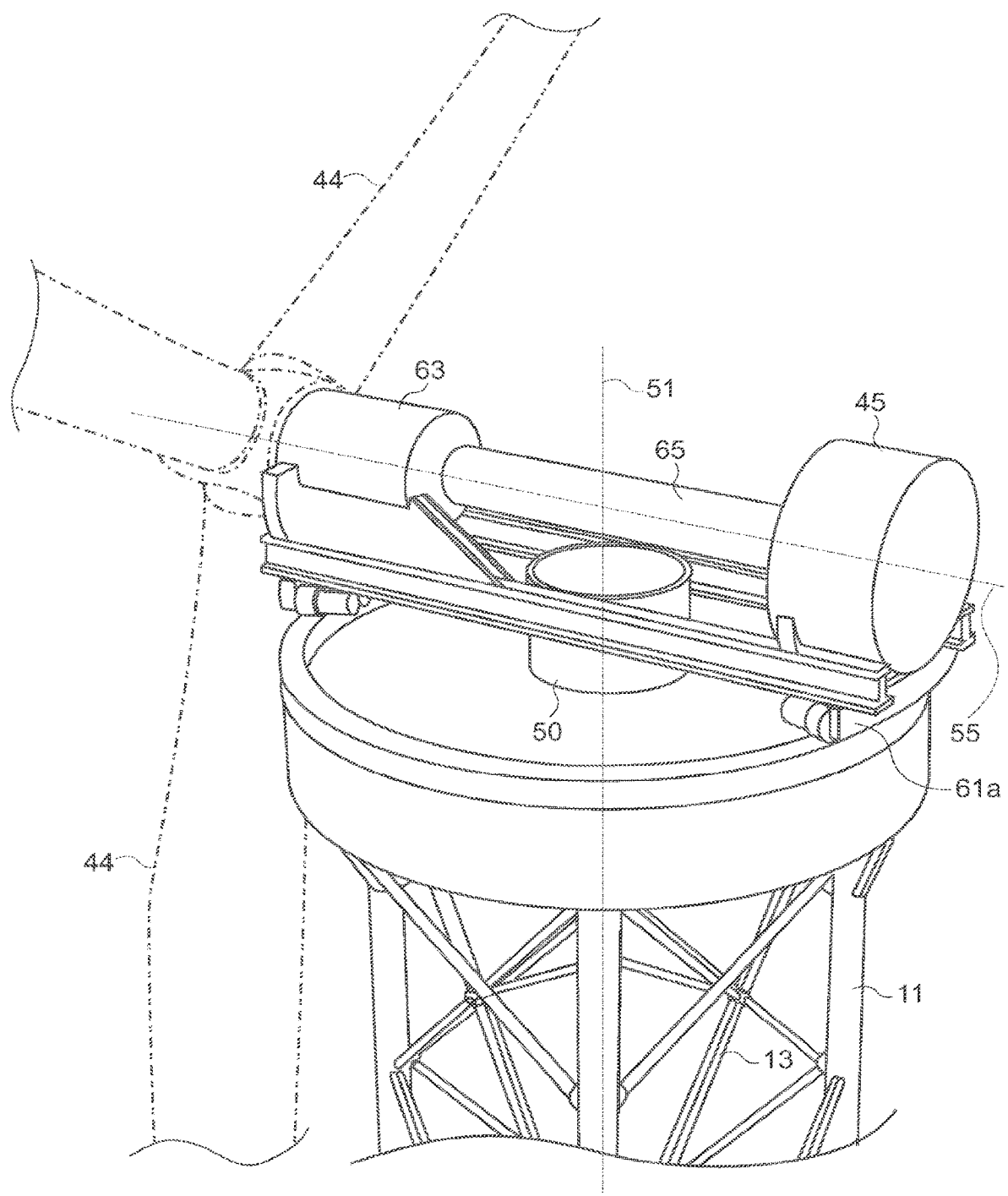
FIG. 31 is a perspective view of another exemplary of a support platform represented as a structure with two interfaces according to one embodiment of this invention.

FIG. 31 is a perspective view of one exemplary of a support platform wherein the yaw rotation mechanism 50 is directly coupled to longeron of turbine support platform 52 without using a furling mechanism 66.

Figure 32:
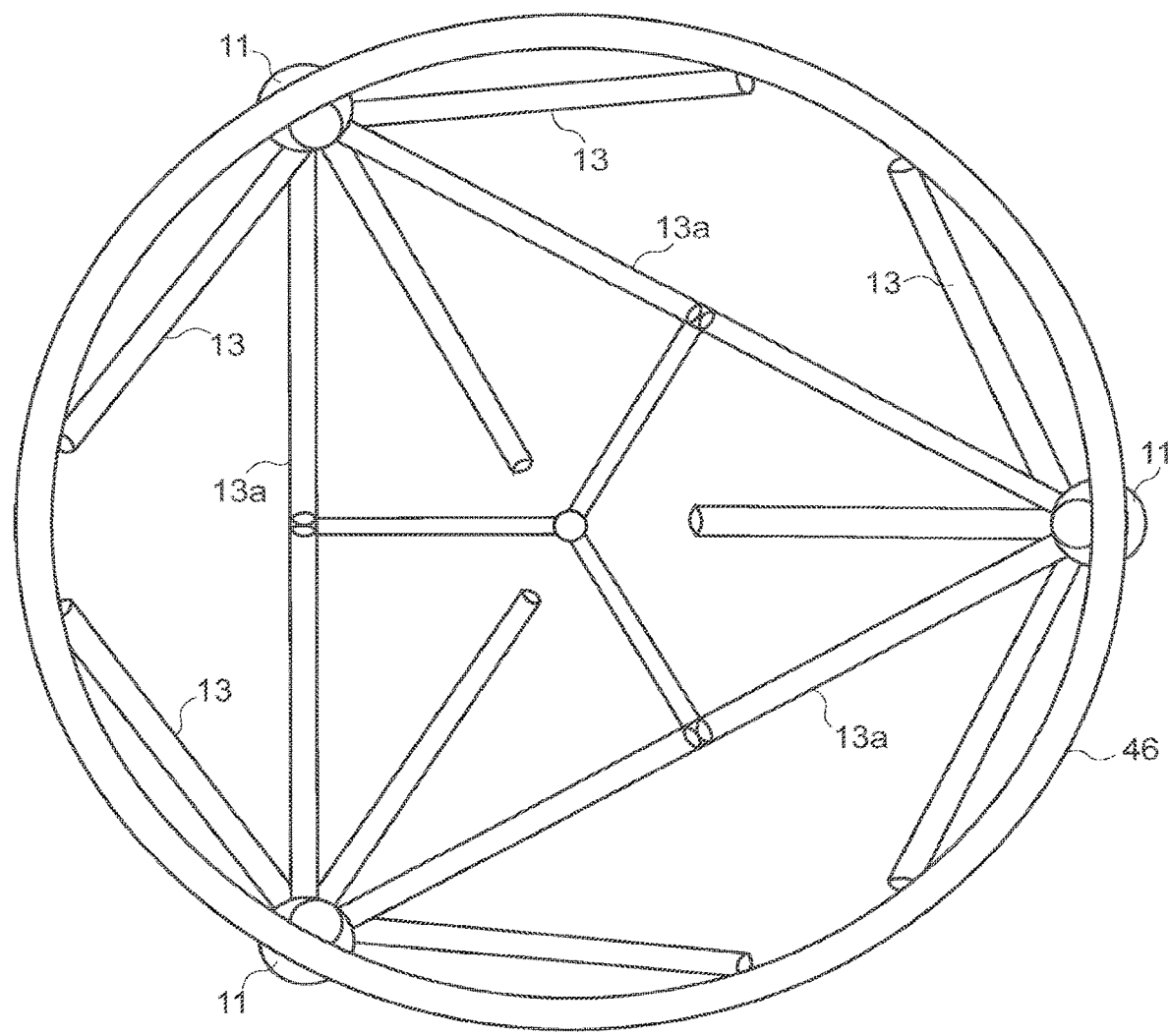
FIG. 32 is a plan view of one exemplary of a support platform showing the connection of the yaw support platform in the top of the lattice tower by bracing members.

FIG. 32 is a plan view of one exemplary of a support platform, representing, for example as the one described in FIG. 23 or 26, showing the connection of the yaw support platform atop the lattice tower 10 by bracing members, preferentially, by six bracing members, symmetrically arranged below the lower surface 48 of the yaw support structure 43.

While exemplary embodiments have been particularly shown and described, various changes in form and details may be made therein by a person skilled in the art. Such changes and other equivalents are also intended to be encompassed by the following claims.

The invention claimed is:

1. A lattice tower for supporting a load, the lattice tower comprising:
    three metallic legs arranged in a triangular configuration around a vertical axis of the lattice tower, wherein each metallic leg has a closed cross-section profile,
        a distance between centers of metallic legs in a bottom portion of the tower is greater than 4 meters,
        an angle of inclination of a central longitudinal axis of each metallic leg in relation to the vertical axis of the tower is between −1.7 degree and +1.7 degrees, and
        a height of the lattice tower is greater than 60 meters;
    a plurality of bracing members; and
    a support platform disposed at a top portion of the lattice tower,
    wherein the lattice tower is vertically divided in three portions, each portion comprising at least one module, and wherein the three portions comprise:
        a first portion comprising three first legs;
        a second portion comprising three second legs, each second leg linearly aligned with and coupled to a corresponding first leg of the first portion; and
        a third portion comprising three third legs, each third leg linearly aligned with and coupled to a corresponding second leg of the second portion,
        couplings between the first, second, and third portions and between modules of the first, second, and third portions comprising flange couplings,
    wherein the support platform comprises three substantially horizontal platform support members, each platform support member coupled to a respective third leg of the third portion, and an inner tubular interface coupled to the three platform support members, the inner tubular interface having a circular cross section and a vertically aligned central axis located substantially centrally within the support platform in a plane defined by the platform support members, the inner tubular interface having a lower end disposed at an elevation corresponding to a bottom of the support platform and an upper end extending above a top of the support platform, and wherein the lattice tower is configured to support a wind turbine.

2. The lattice tower of claim 1, wherein the angle of inclination of the central longitudinal axis of each metallic leg in relation to the vertical axis of the tower is between −1.7 degrees and +1.7 degrees but does not include 0 degrees.

3. The lattice tower of claim 1, wherein the closed cross-section profile of each metallic leg is substantially circular.

4. The lattice tower of claim 1, wherein the lattice tower is configured to support dynamic loads on the support platform at the top portion of the lattice tower that cause reaction forces and moments in a base portion of the lattice tower that are more than 10 times greater than reaction forces and moments caused by wind loads on the lattice tower.

5. The lattice tower of claim 1, wherein the second legs comprise cylindrical structures.

6. The lattice tower of claim 1, wherein an outside diameter to thickness ratio (D/t) of each metallic leg is greater than 30.

7. The lattice tower of claim 1, further comprising auxiliary bracing members, wherein the plurality of bracing members are arranged diagonally and the auxiliary bracing members are arranged horizontally.

8. The lattice tower of claim 1, wherein the plurality of bracing members are inclined between 30° and 60° angle in relation to a central axis of each leg.

9. The lattice tower of claim 1, further comprising auxiliary bracing members, wherein the plurality of bracing members or the auxiliary bracing members comprise at least one channel section including a channel web and channel legs, wherein a length of the channel web is smaller than a length of the channel legs.

10. The lattice tower of claim 1, further comprising auxiliary bracing members, wherein at least one bracing member or one auxiliary bracing member has a closed cross section.

11. The lattice tower of claim 1, further comprising auxiliary bracing members, wherein the plurality of bracing members or the auxiliary bracing members comprise at least one bracing member or one auxiliary bracing member including a composite material.

12. The lattice tower of claim 1, further comprising auxiliary bracing members, wherein the plurality of bracing members or the auxiliary bracing members comprise at least one metallic bracing member or one auxiliary bracing member reinforced with a composite material.

13. The lattice tower of claim 1, wherein the load is one of a downwind turbine and an upwind turbine.

14. The lattice tower of claim 1, wherein at least one leg and/or bracing member comprises an aerodynamic fairing.

15. The lattice tower of claim 1, wherein the load has a greater mass than the lattice tower.

16. The lattice tower of claim 1, wherein the lattice tower has a resonant frequency outside of a frequency range of rotor blades of the wind turbine.

17. A lattice tower for supporting a load, the lattice tower comprising:
    three metallic legs arranged in a triangular configuration around a vertical axis of the lattice tower, wherein each metallic leg has a closed cross-section profile,
        a distance between centers of metallic legs in a bottom portion of the tower is greater than 4 meters, an angle of inclination of a central longitudinal axis of each metallic leg in relation to the vertical axis of the tower is between −1.7 degree and +1.7 degrees, and a height of the lattice tower is greater than 60 meters;

a plurality of bracing members;

auxiliary bracing members, the plurality of bracing members being arranged diagonally and the auxiliary bracing members being arranged horizontally, the auxiliary bracing members extending between a first intersection at midpoints of a first pair of the plurality of bracing members and a second intersection at midpoints of a second pair of the plurality of bracing members; and a support platform disposed at a top portion of the lattice tower, wherein the lattice tower is vertically divided in three portions, each portion comprising at least one module, and wherein the three portions comprise:

a first portion comprising three first legs;

a second portion comprising three second legs, each second leg linearly aligned with and coupled to a corresponding first leg of the first portion; and a third portion comprising three third legs, each third leg linearly aligned with and coupled to a corresponding second leg of the second portion, couplings between the first, second, and third portions and between modules of the first, second, and third portions comprising flange couplings, wherein the support platform comprises three substantially horizontal platform support members, each platform support member coupled to a respective third leg of the third portion, and an inner tubular interface coupled to the three platform support members, the lattice tower configured to support a wind turbine.

* * * * *